(12) United States Patent
Copik et al.

(10) Patent No.: US 12,435,121 B2
(45) Date of Patent: Oct. 7, 2025

(54) COMPOSITIONS AND METHODS FOR STIMULATING NATURAL KILLER CELLS

(71) Applicant: University of Central Florida Research Foundation, Inc., Orlando, FL (US)

(72) Inventors: Alicja Copik, Orlando, FL (US); Griffith Parks, Orlando, FL (US); Jeremiah Oyer, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 778 days.

(21) Appl. No.: 16/752,040

(22) Filed: Jan. 24, 2020

(65) Prior Publication Data
US 2020/0237822 A1 Jul. 30, 2020

Related U.S. Application Data

(60) Provisional application No. 62/796,575, filed on Jan. 24, 2019.

(51) Int. Cl.
| | | |
|---|---|---|
| *A61K 49/18* | (2006.01) | |
| *A61K 40/15* | (2025.01) | |
| *A61K 40/42* | (2025.01) | |
| *A61P 35/04* | (2006.01) | |
| *C07K 14/115* | (2006.01) | |
| *C07K 14/54* | (2006.01) | |
| *C07K 14/735* | (2006.01) | |
| *C12N 5/0783* | (2010.01) | |
| *A61K 38/00* | (2006.01) | |
| *A61K 45/06* | (2006.01) | |

(52) U.S. Cl.
CPC ........ *C07K 14/70535* (2013.01); *A61K 40/15* (2025.01); *A61K 40/42* (2025.01); *A61P 35/04* (2018.01); *C07K 14/115* (2013.01); *C07K 14/54* (2013.01); *C12N 5/0646* (2013.01); *A61K 38/00* (2013.01); *A61K 45/06* (2013.01)

(58) Field of Classification Search
CPC .............. A61K 35/17; C07K 14/70535; C07K 2319/03; C07K 2319/30; C12N 5/0646
See application file for complete search history.

(56) References Cited

U.S. PATENT DOCUMENTS

| | | |
|---|---|---|
| 7,429,384 B2 | 9/2008 | Rivero et al. |
| 9,623,082 B2 | 4/2017 | Copik et al. |
| 2015/0190471 A1* | 7/2015 | Copik ............... A61P 37/02 435/375 |
| 2017/0320959 A1 | 11/2017 | Swanson et al. |
| 2017/0333479 A1 | 11/2017 | Copik et al. |

FOREIGN PATENT DOCUMENTS

| | | |
|---|---|---|
| CN | 102911918 A | 2/2013 |
| EP | 3138905 A1 | 3/2017 |
| JP | 2014227418 A | 12/2014 |
| WO | 2018081652 A1 | 5/2018 |
| WO | 2018089476 A1 | 5/2018 |
| WO | 2018160673 A1 | 9/2018 |
| WO | 2018218151 | 11/2018 |

OTHER PUBLICATIONS

Cruz et al. Targeting Nanosystems to Human DCs via Fc Receptor as an Effective Strategy to Deliver Antigen for Immunotherapy. Mol Pharm. Feb. 7, 2011;8(1):104-16.*
Cruz et al. Targeting Nanoparticles to Dendritic Cells for Immunotherapy. Methods Enzymol. 2012; 509:143-63.*
Sakai et al. Anchoring PEG-oleate to cell membranes stimulates reactive oxygen species production. Colloids Surf B Biointerfaces. Nov. 1, 2016;147:336-342.*
Ernst et al. YidC-driven membrane insertion of single fluorescent Pf3 coat proteins. J Mol Biol. Sep. 16, 2011;412(2):165-75.*
Hashimoto et al. Engineered membrane protein antigens successfully induce antibodies against extracellular regions of claudin-5. Sci Rep. May 30, 2018;8(1):8383.*
Sakamoto et al. (J Biosci Bioeng. Mar. 2012;113(3):322-31.*
Benton et al. Influenza hemagglutinin membrane anchor. Proc Natl Acad Sci U S A., Oct. 2, 2018;115(40):10112-10117.*
Crasto, Chiquito J., and Jin-an Feng. "Linker: a program to generate linker sequences for fusion proteins." Protein engineering 13.5 (2000): 309-312.
Gribskov, Michael, and Richard R. Burgess. "Sigma factors from *E. coli*, B. subtilis, phage SP01, and phage T4 are homologous proteins." Nucleic Acids Research 14.16 (1986): 6745-6763.
Koene, Harry R., et al. "FcγRIIIa-158V/F polymorphism influences the binding of IgG by natural killer cell FcγRIIIa, independently of the FcγRIIIa-48L/R/H phenotype." Blood, The Journal of the American Society of Hematology 90.3 (1997): 1109-1114.
Lombardo, Angelo, et al. "Gene editing in human stem cells using zinc finger nucleases and integrase-defective lentiviral vector delivery." Nature biotechnology 25.11 (2007): 1298-1306.
Moehle, Erica A., et al. "Targeted gene addition into a specified location in the human genome using designed zinc finger nucleases." Proceedings of the National Academy of Sciences 104.9 (2007): 3055-3060.
Santiago, Yolanda, et al. "Targeted gene knockout in mammalian cells by using engineered zinc-finger nucleases." Proceedings of the National Academy of Sciences 105.15 (2008): 5809-5814.
Smith, Temple F., and Michael S. Waterman. "Comparison of biosequences." Advances in applied mathematics 2.4 (1981): 482-489.
Urnov, Fyodor D., et al. "Highly efficient endogenous human gene correction using designed zinc-finger nucleases." Nature 435.7042 (2005): 646-651.

(Continued)

*Primary Examiner* — Dong Jiang
(74) *Attorney, Agent, or Firm* — Meunier Carlin & Curfman LLC

(57) ABSTRACT

Compositions and methods for stimulating NK cell expansion and cytotoxicity are described. Therapeutic compositions and methods using expanded and stimulated NK cells are described.

16 Claims, 8 Drawing Sheets

Specification includes a Sequence Listing.

(56) References Cited

OTHER PUBLICATIONS

Wu, Jianming, et al. "A novel polymorphism of FcgammaRIIIa (CD16) alters receptor function and predisposes to autoimmune disease." The Journal of clinical investigation 100.5 (1997): 1059-1070.
International Search Report and Written Opinion issued for Application No. PCT/US2020/015021, dated Jun. 11, 2020.
English translation of Office Action issued in Russian Application No. 2021123650/10, mailed Jun. 30, 2023.
English translation of Office Action issued in Indonesian Application No. P00202105939, mailed Jul. 7, 2023.
Phan et al. "Expansion of NK Cells Using Genetically Engineered K562 Feeder Cells", Natural Killer Cells: Methods and Protocols, Methods in Molecular Biology, 2016, pp. 167-174.
Awan et al. "CD19 targeting of chronic lymphocytic leukemia with a novel Fe-domain-engineered monoclonal antibody", Blood, American Society of Hematology, vol. 115, No. 6, Feb. 1, 2010, pp. 1204-1213.
Extended European Search Report issued in EP20744708.7, mailed Oct. 18, 2022.
Argentova V.V. et al., Studies of the influence of different eukaryotic vectors' design on the expression of recombinant antibody IgA1 isotype, Bulletin of Moscow University, Series 16: Biology, 2017, Vo. 72, No. 2, pp. 75-81, 77-79.
Acchione M. et al., Impact of linker and conjugation chemistry on antigen binding, Fc receptor binding and thermal stability of model antibody-drug conjugates, MAbs, 2012, v. 4, n. 3, p. 362-372.
Chen X. et al., Fusion protein linkers: property, design and functionality, Advanced drug delivery reviews, 2013, v. 65, n. 10, p. 1357-1369.
Maeda Y. et al., Engineering of functional chimeric protein G-Vargula Luciferase, Analytical biochemistry, 1997, v. 249, n. 2, p. 147-152.
Abakushina E.V. et al., The main characteristics of human natural killer cells, Immunology, 2012, n. 4, p. 220-224.
Muller S. et al., Spliceosomal peptide P140 for immunotherapy of systemic lupus erythematosus: results of an early phase II clinical trial, Arthritis & Rheumatism: Official Journal of the American College of Rheumatology, 2008, v. 58, n. 12, p. 3873-3883.
Lee K.H. et al., Increased vaccine-specific T cell frequency after peptide-based vaccination correlates with increased susceptibility to in vitro stimulation but does not lead to tumor regression, J. Immunol., 1999, v. 163, n. 11, p. 6292-6300.
Gura T., Systems for identifying new drugs are often faulty, Science, 1997, v.278, n.5340, p. 1041-1042.
Jain R.K., Barriers to drug delivery in solid tumors, Sci. Am., 1994, v.271, n. 1, p. 58-65.
Nelson, D. et al., The "Trojan Horse" Approach to Tumor Immunotherapy: Targeting the Tumor Microenvironment, J. Immunol. Res., 2014, v.2014, art.789069, p. 1-14.

* cited by examiner

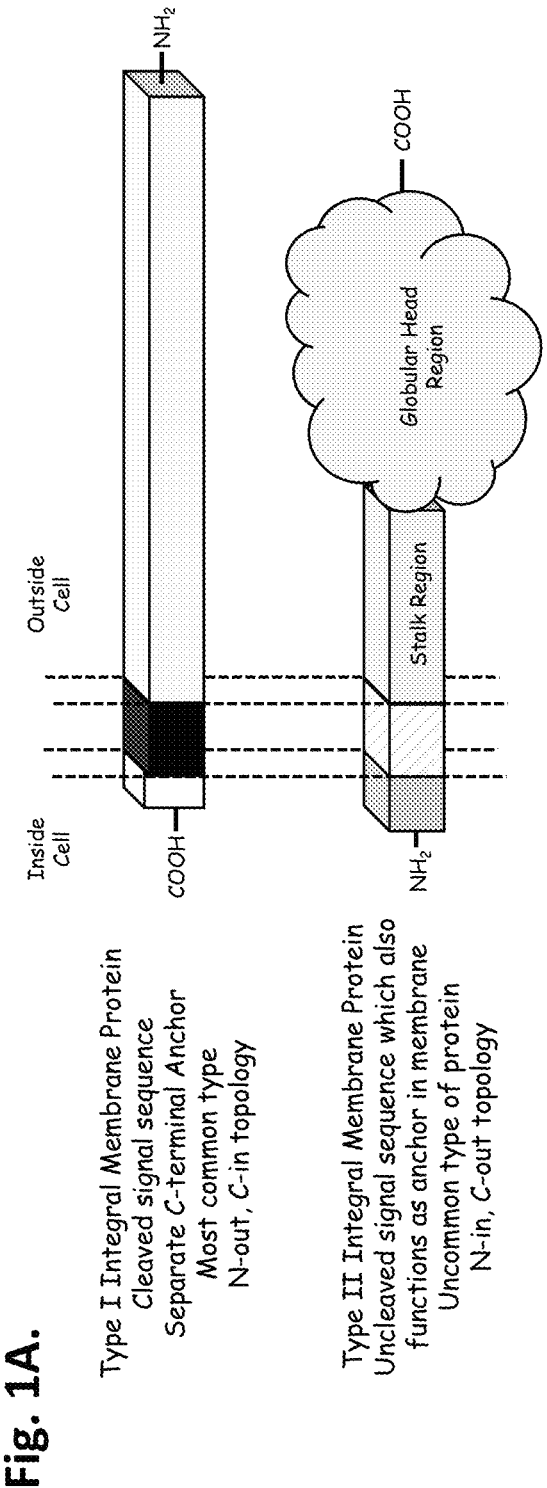
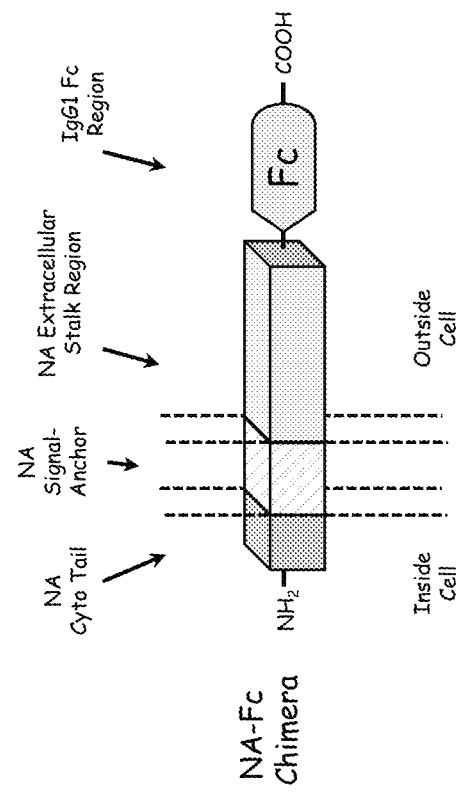
Fig. 1A.
Fig. 1B.

SEQUENCE LISTING

<160> NUMBER OF SEQ IDS NOS: 31

<210> SEQ ID NO 1
<211> LENGTH: 50
<212> TYPE: PRT
<213> ORGANISM: Homo sapiens

<400> SEQUENCE: 1

Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
        35                  40                  45

Cys Asn
    50

<210> SEQ ID NO 2
<211> LENGTH: 6
<212> TYPE: PRT
<213> ORGANISM: Artificial Sequence
<220> FEATURE:
<223> OTHER INFORMATION: Synthetic contruct

<400> SEQUENCE: 2

Leu Glu Gly Gly Gly Ser
1               5

<210> SEQ ID NO 3
<211> LENGTH: 4
<212> TYPE: PRT
<213> ORGANISM: Artificial Sequence
<220> FEATURE:
<223> OTHER INFORMATION: Synthetic construct

<400> SEQUENCE: 3

Thr Gly Ser Gly
1

<210> SEQ ID NO 4
<211> LENGTH: 8
<212> TYPE: PRT
<213> ORGANISM: Artificial Sequence
<220> FEATURE:
<223> OTHER INFORMATION: Synthetic construct

<400> SEQUENCE: 4

Gly Gly Ser Gly Gly Gly Ser Gly
1               5

<210> SEQ ID NO 5
<211> LENGTH: 10
<212> TYPE: PRT
<213> ORGANISM: Artificial Sequence
<220> FEATURE:
<223> OTHER INFORMATION: Synthetic construct

<400> SEQUENCE: 5

Gly Gly Gly Gly Ser Gly Gly Gly Gly Ser
1               5                   10

<210> SEQ ID NO 6
<211> LENGTH: 4
<212> TYPE: PRT
<213> ORGANISM: Artificial Sequence
<220> FEATURE:
<223> OTHER INFORMATION: Synthetic construct

<400> SEQUENCE: 6

Gly Gly Gly Ser
1

<210> SEQ ID NO 7
<211> LENGTH: 6
<212> TYPE: PRT
<213> ORGANISM: Artificial Sequence
<220> FEATURE:
<223> OTHER INFORMATION: Synthetic construct

<400> SEQUENCE: 7

Gly Ser Gly Gly Gly Gly
1               5

<210> SEQ ID NO 8
<211> LENGTH: 5
<212> TYPE: PRT
<213> ORGANISM: Artificial Sequence
<220> FEATURE:
<223> OTHER INFORMATION: Synthetic construct

<400> SEQUENCE: 8

Glu Ala Ala Ala Lys

```
<210> SEQ ID NO 9
<211> LENGTH: 7
<212> TYPE: PRT
<213> ORGANISM: Artificial Sequence
<220> FEATURE:
<223> OTHER INFORMATION: Synthetic construct

<400> SEQUENCE: 9

Ala Glu Ala Ala Ala Lys Ala
1               5

<210> SEQ ID NO 10
<211> LENGTH: 5
<212> TYPE: PRT
<213> ORGANISM: Artificial Sequence
<220> FEATURE:
<223> OTHER INFORMATION: Synthetic Construct

<400> SEQUENCE: 10

Pro Ala Pro Ala Pro
1               5

<210> SEQ ID NO 11
<211> LENGTH: 15
<212> TYPE: PRT
<213> ORGANISM: Artificial Sequence
<220> FEATURE:
<223> OTHER INFORMATION: Synthetic Construct

<400> SEQUENCE: 11

Asp Lys Thr His Thr Cys Pro Pro Cys Pro Ala Pro Glu Leu Leu
1               5                   10                  15

<210> SEQ ID NO 12
<211> LENGTH: 11
<212> TYPE: PRT
<213> ORGANISM: Artificial Sequence
<220> FEATURE:
<223> OTHER INFORMATION: Synthetic Construct

<400> SEQUENCE: 12

Thr Cys Pro Pro Cys Pro Ala Pro Glu Leu Leu
1               5                   10

<210> SEQ ID NO 13
<211> LENGTH: 279
<212> TYPE: PRT
<213> ORGANISM: Artificial Sequence
<220> FEATURE:
<223> OTHER INFORMATION: Synthetic Construct

<400> SEQUENCE: 13

Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
                20                  25                  30

Trp Ile Ser His Ser Ile Gln Thr Gly Ser Gln Asn His Thr Gly Ile
            35                  40                  45

Cys Asn Arg Ser Asp Lys Thr His Thr Cys Pro Pro Cys Pro Ala Pro
        50                  55                  60

Glu Leu Leu Gly Gly Pro Ser Val Phe Leu Phe Pro Pro Lys Pro Lys
65                  70                  75                  80
```

```
Asp Thr Leu Met Ile Ser Arg Thr Pro Glu Val Thr Cys Val Val Val
                85                  90                  95
Asp Val Ser His Glu Asp Pro Glu Val Lys Phe Asn Trp Tyr Val Asp
            100                 105                 110
Gly Val Glu Val His Asn Ala Lys Thr Lys Pro Arg Glu Glu Gln Tyr
        115                 120                 125
Asn Ser Thr Tyr Arg Val Val Ser Val Leu Thr Val Leu His Gln Asp
    130                 135                 140
Trp Leu Asn Gly Lys Glu Tyr Lys Cys Lys Val Ser Asn Lys Ala Leu
145                 150                 155                 160
Pro Ala Pro Ile Glu Lys Thr Ile Ser Lys Ala Lys Gly Gln Pro Arg
                165                 170                 175
Glu Pro Gln Val Tyr Thr Leu Pro Pro Ser Arg Glu Glu Met Thr Lys
            180                 185                 190
Asn Gln Val Ser Leu Thr Cys Leu Val Lys Gly Phe Tyr Pro Ser Asp
        195                 200                 205
Ile Ala Val Glu Trp Glu Ser Asn Gly Gln Pro Glu Asn Asn Tyr Lys
    210                 215                 220
Thr Thr Pro Pro Val Leu Asp Ser Asp Gly Ser Phe Phe Leu Tyr Ser
225                 230                 235                 240
Lys Leu Thr Val Asp Lys Ser Arg Trp Gln Gln Gly Asn Val Phe Ser
                245                 250                 255
Cys Ser Val Met His Glu Ala Leu His Asn His Tyr Thr Gln Lys Ser
            260                 265                 270
Leu Ser Leu Ser Pro Gly Lys
        275

<210> SEQ ID NO 14
<211> LENGTH: 212
<212> TYPE: PRT
<213> ORGANISM: Artificial Sequence
<220> FEATURE:
<223> OTHER INFORMATION: Synthetic Construct

<400> SEQUENCE: 14

Gly Gly Pro Ser Val Phe Leu Phe Pro Pro Lys Pro Lys Asp Thr Leu
1               5                   10                  15
Met Ile Ser Arg Thr Pro Glu Val Thr Cys Val Val Val Asp Val Ser
            20                  25                  30
His Glu Asp Pro Glu Val Lys Phe Asn Trp Tyr Val Asp Gly Val Glu
        35                  40                  45
Val His Asn Ala Lys Thr Lys Pro Arg Glu Glu Gln Tyr Asn Ser Thr
    50                  55                  60
Tyr Arg Val Val Ser Val Leu Thr Val Leu His Gln Asp Trp Leu Asn
65                  70                  75                  80
Gly Lys Glu Tyr Lys Cys Lys Val Ser Asn Lys Ala Leu Pro Ala Pro
                85                  90                  95
Ile Glu Lys Thr Ile Ser Lys Ala Lys Gly Gln Pro Arg Glu Pro Gln
            100                 105                 110
Val Tyr Thr Leu Pro Pro Ser Arg Glu Glu Met Thr Lys Asn Gln Val
        115                 120                 125
Ser Leu Thr Cys Leu Val Lys Gly Phe Tyr Pro Ser Asp Ile Ala Val
    130                 135                 140
Glu Trp Glu Ser Asn Gly Gln Pro Glu Asn Asn Tyr Lys Thr Thr Pro
145                 150                 155                 160
```

Pro Val Leu Asp Ser Asp Gly Ser Phe Phe Leu Tyr Ser Lys Leu Thr
                165                 170                 175

Val Asp Lys Ser Arg Trp Gln Gln Gly Asn Val Phe Ser Cys Ser Val
            180                 185                 190

Met His Glu Ala Leu His Asn His Tyr Thr Gln Lys Ser Leu Ser Leu
        195                 200                 205

Ser Pro Gly Lys
    210

<210> SEQ ID NO 15
<211> LENGTH: 105
<212> TYPE: PRT
<213> ORGANISM: Artificial Sequence
<220> FEATURE:
<223> OTHER INFORMATION: Synthetic Construct

<400> SEQUENCE: 15

Gly Gly Pro Ser Val Phe Leu Phe Pro Pro Lys Pro Lys Asp Thr Leu
1               5                   10                  15

Met Ile Ser Arg Thr Pro Glu Val Thr Cys Val Val Val Asp Val Ser
            20                  25                  30

His Glu Asp Pro Glu Val Lys Phe Asn Trp Tyr Val Asp Gly Val Glu
        35                  40                  45

Val His Asn Ala Lys Thr Lys Pro Arg Glu Glu Gln Tyr Asn Ser Thr
    50                  55                  60

Tyr Arg Val Val Ser Val Leu Thr Val Leu His Gln Asp Trp Leu Asn
65                  70                  75                  80

Gly Lys Glu Tyr Lys Cys Lys Val Ser Asn Lys Ala Leu Pro Ala Pro
                85                  90                  95

Ile Glu Lys Thr Ile Ser Lys Ala Lys
            100                 105

<210> SEQ ID NO 16
<211> LENGTH: 107
<212> TYPE: PRT
<213> ORGANISM: Artificial Sequence
<220> FEATURE:
<223> OTHER INFORMATION: Synthetic Construct

<400> SEQUENCE: 16

Gly Gln Pro Arg Glu Pro Gln Val Tyr Thr Leu Pro Pro Ser Arg Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Pro Gly Lys
            100                 105

<210> SEQ ID NO 17
<211> LENGTH: 120
<212> TYPE: PRT
<213> ORGANISM: Homo sapiens

<400> SEQUENCE: 17

Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
                35                  40                  45

Cys Asn Gln Asn Ile Ile Thr Tyr Lys Asn Ser Thr Trp Val Lys Asp
        50                  55                  60

Thr Thr Ser Val Ile Leu Thr Gly Asn Ser Ser Leu Cys Pro Ile Arg
65                  70                  75                  80

Gly Trp Ala Ile Tyr Ser Lys Asp Asn Ser Ile Arg Ile Gly Ser Lys
                85                  90                  95

Gly Asp Val Phe Val Ile Arg Glu Pro Phe Ile Ser Cys Ser His Leu
            100                 105                 110

Glu Cys Arg Thr Phe Phe Leu Thr
            115                 120

<210> SEQ ID NO 18
<211> LENGTH: 347
<212> TYPE: PRT
<213> ORGANISM: Artificial Sequence
<220> FEATURE:
<223> OTHER INFORMATION: Synthetic Construct

<400> SEQUENCE: 18

Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
                35                  40                  45

Cys Asn Gln Asn Ile Ile Thr Tyr Lys Asn Ser Thr Trp Val Lys Asp
        50                  55                  60

Thr Thr Ser Val Ile Leu Thr Gly Asn Ser Ser Leu Cys Pro Ile Arg
65                  70                  75                  80

Gly Trp Ala Ile Tyr Ser Lys Asp Asn Ser Ile Arg Ile Gly Ser Lys
                85                  90                  95

Gly Asp Val Phe Val Ile Arg Glu Pro Phe Ile Ser Cys Ser His Leu
            100                 105                 110

Glu Cys Arg Thr Phe Phe Leu Thr Asp Lys Thr His Thr Cys Pro Pro
            115                 120                 125

Cys Pro Ala Pro Glu Leu Leu Gly Gly Pro Ser Val Phe Leu Phe Pro
        130                 135                 140

Pro Lys Pro Lys Asp Thr Leu Met Ile Ser Arg Thr Pro Glu Val Thr
145                 150                 155                 160

Cys Val Val Val Asp Val Ser His Glu Asp Pro Glu Val Lys Phe Asn
                165                 170                 175

Trp Tyr Val Asp Gly Val Glu Val His Asn Ala Lys Thr Lys Pro Arg
            180                 185                 190

Glu Glu Gln Tyr Asn Ser Thr Tyr Arg Val Val Ser Val Leu Thr Val
        195                 200                 205

Leu His Gln Asp Trp Leu Asn Gly Lys Glu Tyr Lys Cys Lys Val Ser
    210                 215                 220

Asn Lys Ala Leu Pro Ala Pro Ile Glu Lys Thr Ile Ser Lys Ala Lys
225                 230                 235                 240

Gly Gln Pro Arg Glu Pro Gln Val Tyr Thr Leu Pro Pro Ser Arg Glu
            245                 250                 255

Glu Met Thr Lys Asn Gln Val Ser Leu Thr Cys Leu Val Lys Gly Phe
        260                 265                 270

Tyr Pro Ser Asp Ile Ala Val Glu Trp Glu Ser Asn Gly Gln Pro Glu
    275                 280                 285

Asn Asn Tyr Lys Thr Thr Pro Pro Val Leu Asp Ser Asp Gly Ser Phe
290                 295                 300

Phe Leu Tyr Ser Lys Leu Thr Val Asp Lys Ser Arg Trp Gln Gln Gly
305                 310                 315                 320

Asn Val Phe Ser Cys Ser Val Met His Glu Ala Leu His Asn His Tyr
                325                 330                 335

Thr Gln Lys Ser Leu Ser Leu Ser Pro Gly Lys
            340                 345

<210> SEQ ID NO 19
<211> LENGTH: 1044
<212> TYPE: DNA
<213> ORGANISM: Artificial Sequence
<220> FEATURE:
<223> OTHER INFORMATION: Synthetic Construct

<400> SEQUENCE: 19
atgaatccaa atcagaaaat aacaaccatt ggatcaatct gtctggtagt cggactaatt      60
agcctaatat tgcaaatagg gaatataatc tcaatatgga ttagccattc aattcaaact     120
ggaagtcaaa accatactgg aatatgcaac caaaacatca ttacctataa aaatagcacc     180
tgggtaaagg acacaacttc agtgatatta accggcaatt catctctttg tcccatccgt     240
gggtgggcta tacagcaa agacaatagc ataagaattg gttccaaagg agacgttttt      300
gtcataagag agcccttat ttcatgttct cacttggaat gcaggaccttt ttttctgacc      360
gacaaaactc acacatgccc accgtgccca gcacctgaac tcctgggggg accgtcagtc     420
ttcctcttcc cccccaaaacc caaggacacc ctcatgatct cccggacccc tgaggtcaca     480
tgcgtggtgg tggacgtgag ccacgaagac cctgaggtca agttcaactg gtacgtggac     540
ggcgtggagg tgcataatgc caagacaaag ccgcggagg agcagtacaa cagcacgtac     600
cgtgtggtca gcgtcctcac cgtcctgcac caggactggc tgaatggcaa ggagtacaag     660
tgcaaggtct ccaacaaagc cctcccagcc cccatcgaga aaaccatctc caaagccaaa     720
gggcagcccc gagaaccaca ggtgtacacc ctgcccccat cccgggagga gatgaccaag     780
aaccaggtca gcctgacctg cctggtcaaa ggcttctatc ccagcgacat cgccgtggag     840
tgggagagca atgggcagcc ggagaacaac tacaagacca cgcctcccgt gctggactcc     900
gacggctcct tcttcctcta cagcaagctc accgtggaca agagcaggtg gcagcagggg     960
aacgtcttct catgctccgt gatgcacgag gctctgcaca accactacac gcagaagagc    1020
ctctccctgt ctccgggtaa ataa                                          1044

<210> SEQ ID NO 20
<211> LENGTH: 347
<212> TYPE: PRT
<213> ORGANISM: Artificial Sequence
<220> FEATURE:
<223> OTHER INFORMATION: Synthetic Construct

<400> SEQUENCE: 20

Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
        35                  40                  45

Cys Asn Gln Asn Ile Ile Thr Tyr Lys Asn Ser Thr Trp Val Lys Asp
    50                  55                  60

Thr Thr Ser Val Ile Leu Thr Gly Asn Ser Ser Leu Cys Pro Ile Arg
65                  70                  75                  80

Gly Trp Ala Ile Tyr Ser Lys Asp Asn Ser Ile Arg Ile Gly Ser Lys
                85                  90                  95

Gly Asp Val Phe Val Ile Arg Glu Pro Phe Ile Ser Cys Ser His Leu
                100                 105                 110

Glu Cys Arg Thr Phe Phe Leu Thr Asp Lys Thr His Thr Cys Pro Pro
            115                 120                 125

Cys Pro Ala Pro Glu Leu Leu Gly Gly Pro Ser Val Phe Leu Leu Pro
        130                 135                 140

Pro Lys Pro Lys Asp Thr Leu Met Ile Ser Arg Thr Pro Glu Val Thr
145                 150                 155                 160

Cys Val Val Val Asp Val Ser His Glu Asp Pro Glu Val Lys Phe Asn
                165                 170                 175

Trp Tyr Val Asp Gly Val Glu Val His Asn Ala Lys Thr Lys Pro Pro
                180                 185                 190

Glu Glu Gln Tyr Asn Ser Thr Leu Arg Val Val Ser Ile Leu Thr Val
            195                 200                 205

Leu His Gln Asp Trp Leu Asn Gly Lys Glu Tyr Lys Cys Lys Val Ser
        210                 215                 220

Asn Lys Ala Leu Pro Ala Pro Ile Glu Lys Thr Ile Ser Lys Ala Lys
225                 230                 235                 240

Gly Gln Pro Arg Glu Pro Gln Val Tyr Thr Leu Pro Pro Ser Arg Glu
                245                 250                 255

Glu Met Thr Lys Asn Gln Val Ser Leu Thr Cys Leu Val Lys Gly Phe
                260                 265                 270

Tyr Pro Ser Asp Ile Ala Val Glu Trp Glu Ser Asn Gly Gln Pro Glu
            275                 280                 285

Asn Asn Tyr Lys Thr Thr Pro Leu Val Leu Asp Ser Asp Gly Ser Phe
        290                 295                 300

Phe Leu Tyr Ser Lys Leu Thr Val Asp Lys Ser Arg Trp Gln Gln Gly
305                 310                 315                 320

Asn Val Phe Ser Cys Ser Val Met His Glu Ala Leu His Asn His Tyr
                325                 330                 335

Thr Gln Lys Ser Leu Ser Leu Ser Pro Gly Lys
            340                 345

<210> SEQ ID NO 21
<211> LENGTH: 211
<212> TYPE: PRT
<213> ORGANISM: Artificial Sequence
<220> FEATURE:
<223> OTHER INFORMATION: Synthetic Construct

<400> SEQUENCE: 21

Gly Gly Pro Asp Val Phe Leu Phe Pro Pro Lys Pro Lys Asp Thr Leu
1               5                   10                  15

```
Met Ile Ser Arg Thr Pro Glu Val Thr Cys Val Val Asp Val Ser
        20                  25                  30

His Glu Asp Pro Glu Val Lys Phe Asn Trp Tyr Val Asp Gly Val Glu
            35                  40                  45

Val His Asn Ala Lys Thr Lys Pro Arg Glu Glu Gln Tyr Asn Ser Thr
 50                  55                  60

Tyr Arg Val Val Ser Val Leu Thr Val Leu His Gln Asp Trp Leu Asn
 65                  70                  75                  80

Gly Lys Glu Tyr Lys Cys Lys Val Ser Asn Lys Ala Leu Pro Leu Pro
                85                  90                  95

Glu Glu Lys Thr Ile Ser Lys Ala Lys Gly Gln Pro Arg Glu Pro Gln
            100                 105                 110

Val Tyr Thr Leu Pro Pro Ser Arg Glu Glu Met Thr Lys Asn Gln Val
            115                 120                 125

Ser Leu Thr Cys Leu Val Lys Gly Phe Tyr Pro Ser Asp Ile Ala Val
 130                 135                 140

Glu Trp Glu Ser Asn Gly Gln Pro Glu Asn Asn Tyr Lys Thr Thr Pro
 145                 150                 155                 160

Pro Val Leu Asp Ser Asp Gly Ser Phe Phe Leu Tyr Ser Lys Leu Thr
                165                 170                 175

Val Asp Lys Ser Arg Trp Gln Gln Gly Asn Val Phe Ser Cys Ser Val
            180                 185                 190

Met His Glu Ala Leu His Asn His Tyr Thr Gln Lys Ser Leu Ser Leu
            195                 200                 205

Ser Pro Gly
        210

<210> SEQ ID NO 22
<211> LENGTH: 105
<212> TYPE: PRT
<213> ORGANISM: Artificial Sequence
<220> FEATURE:
<223> OTHER INFORMATION: Synthetic Construct

<400> SEQUENCE: 22

Gly Gly Pro Asp Val Phe Leu Phe Pro Pro Lys Pro Lys Asp Thr Leu
 1               5                  10                  15

Met Ile Ser Arg Thr Pro Glu Val Thr Cys Val Val Asp Val Ser
        20                  25                  30

His Glu Asp Pro Glu Val Lys Phe Asn Trp Tyr Val Asp Gly Val Glu
            35                  40                  45

Val His Asn Ala Lys Thr Lys Pro Arg Glu Glu Gln Tyr Asn Ser Thr
 50                  55                  60

Tyr Arg Val Val Ser Val Leu Thr Val Leu His Gln Asp Trp Leu Asn
 65                  70                  75                  80

Gly Lys Glu Tyr Lys Cys Lys Val Ser Asn Lys Ala Leu Pro Leu Pro
                85                  90                  95

Glu Glu Lys Thr Ile Ser Lys Ala Lys
            100                 105

<210> SEQ ID NO 23
<211> LENGTH: 347
<212> TYPE: PRT
<213> ORGANISM: Artificial Sequence
<220> FEATURE:
<223> OTHER INFORMATION: Synthetic Construct
```

<400> SEQUENCE: 23

```
Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
        35                  40                  45

Cys Asn Gln Asn Ile Ile Thr Tyr Lys Asn Ser Thr Trp Val Lys Asp
    50                  55                  60

Thr Thr Ser Val Ile Leu Thr Gly Asn Ser Ser Leu Cys Pro Ile Arg
65                  70                  75                  80

Gly Trp Ala Ile Tyr Ser Lys Asp Asn Ser Ile Arg Ile Gly Ser Lys
                85                  90                  95

Gly Asp Val Phe Val Ile Arg Glu Pro Phe Ile Ser Cys Ser His Leu
            100                 105                 110

Glu Cys Arg Thr Phe Phe Leu Thr Asp Lys Thr His Thr Cys Pro Pro
        115                 120                 125

Cys Pro Ala Pro Glu Leu Leu Gly Gly Pro Asp Val Phe Leu Phe Pro
    130                 135                 140

Pro Lys Pro Lys Asp Thr Leu Met Ile Ser Arg Thr Pro Glu Val Thr
145                 150                 155                 160

Cys Val Val Val Asp Val Ser His Glu Asp Pro Glu Val Lys Phe Asn
                165                 170                 175

Trp Tyr Val Asp Gly Val Glu Val His Asn Ala Lys Thr Lys Pro Arg
            180                 185                 190

Glu Glu Gln Tyr Asn Ser Thr Tyr Arg Val Val Ser Val Leu Thr Val
        195                 200                 205

Leu His Gln Asp Trp Leu Asn Gly Lys Glu Tyr Lys Cys Lys Val Ser
    210                 215                 220

Asn Lys Ala Leu Pro Leu Pro Glu Glu Lys Thr Ile Ser Lys Ala Lys
225                 230                 235                 240

Gly Gln Pro Arg Glu Pro Gln Val Tyr Thr Leu Pro Pro Ser Arg Glu
                245                 250                 255

Glu Met Thr Lys Asn Gln Val Ser Leu Thr Cys Leu Val Lys Gly Phe
            260                 265                 270

Tyr Pro Ser Asp Ile Ala Val Glu Trp Glu Ser Asn Gly Gln Pro Glu
        275                 280                 285

Asn Asn Tyr Lys Thr Thr Pro Pro Val Leu Asp Ser Asp Gly Ser Phe
    290                 295                 300

Phe Leu Tyr Ser Lys Leu Thr Val Asp Lys Ser Arg Trp Gln Gln Gly
305                 310                 315                 320

Asn Val Phe Ser Cys Ser Val Met His Glu Ala Leu His Asn His Tyr
                325                 330                 335

Thr Gln Lys Ser Leu Ser Leu Ser Pro Gly Lys
            340                 345
```

<210> SEQ ID NO 24
<211> LENGTH: 106
<212> TYPE: PRT
<213> ORGANISM: Artificial Sequence
<220> FEATURE:
<223> OTHER INFORMATION: Synthetic Construct

<400> SEQUENCE: 24

Gly Gln Pro Arg Glu Pro Gln Val Tyr Thr Leu Pro Pro Ser Arg Glu

-continued

```
              1               5                  10                 15
            Glu Met Thr Lys Asn Gln Val Ser Leu Thr Cys Leu Val Lys Gly Phe
                            20                  25                 30
            Tyr Pro Ser Asp Ile Ala Val Glu Trp Glu Ser Asn Gly Gln Pro Glu
                            35                  40                 45
            Asn Asn Tyr Lys Thr Thr Pro Pro Val Leu Asp Ser Asp Gly Ser Phe
             50                              55                 60
            Phe Leu Tyr Ser Lys Leu Thr Val Asp Lys Ser Arg Trp Gln Gln Gly
             65                  70                  75                 80
            Asn Val Phe Ser Cys Ser Val Met His Glu Ala Leu His Asn His Tyr
                                85                  90                 95
            Thr Gln Lys Ser Leu Ser Leu Ser Pro Gly
                           100                 105
```

<210> SEQ ID NO 25
<211> LENGTH: 212
<212> TYPE: PRT
<213> ORGANISM: Artificial Sequence
<220> FEATURE:
<223> OTHER INFORMATION: Synthetic Construct

<400> SEQUENCE: 25

```
            Gly Gly Pro Ser Val Phe Leu Leu Pro Pro Lys Pro Lys Asp Thr Leu
             1               5                  10                 15
            Met Ile Ser Arg Thr Pro Glu Val Thr Cys Val Val Val Asp Val Ser
                            20                  25                 30
            His Glu Asp Pro Glu Val Lys Phe Asn Trp Tyr Val Asp Gly Val Glu
                            35                  40                 45
            Val His Asn Ala Lys Thr Lys Pro Arg Glu Glu Gln Tyr Asn Ser Thr
             50                              55                 60
            Leu Arg Val Val Ser Ile Leu Thr Val Leu His Gln Asp Trp Leu Asn
             65                  70                  75                 80
            Gly Lys Glu Tyr Lys Cys Lys Val Ser Asn Lys Ala Leu Pro Ala Pro
                                85                  90                 95
            Ile Glu Lys Thr Ile Ser Lys Ala Lys Gly Gln Pro Arg Glu Pro Gln
                           100                 105                110
            Val Tyr Thr Leu Pro Pro Ser Arg Glu Glu Met Thr Lys Asn Gln Val
                           115                 120                 125
            Ser Leu Thr Cys Leu Val Lys Gly Phe Tyr Pro Ser Asp Ile Ala Val
                           130                 135                 140
            Glu Trp Glu Ser Asn Gly Gln Pro Glu Asn Asn Tyr Lys Thr Thr Pro
            145                 150                 155                 160
            Leu Val Leu Asp Ser Asp Gly Ser Phe Phe Leu Tyr Ser Lys Leu Thr
                           165                 170                 175
            Val Asp Lys Ser Arg Trp Gln Gln Gly Asn Val Phe Ser Cys Ser Val
                           180                 185                 190
            Met His Glu Ala Leu His Asn His Tyr Thr Gln Lys Ser Leu Ser Leu
                           195                 200                 205
            Ser Pro Gly Lys
                           210
```

<210> SEQ ID NO 26
<211> LENGTH: 105
<212> TYPE: PRT
<213> ORGANISM: Artificial Sequence
<220> FEATURE:
<223> OTHER INFORMATION: Synthetic Construct -continued

<400> SEQUENCE: 26

Gly Gly Pro Ser Val Phe Leu Leu Pro Pro Lys Asp Thr Leu
1               5                   10                  15

Met Ile Ser Arg Thr Pro Glu Val Thr Cys Val Val Val Asp Val Ser
                20                  25                  30

His Glu Asp Pro Glu Val Lys Phe Asn Trp Tyr Val Asp Gly Val Glu
            35                  40                  45

Val His Asn Ala Lys Thr Lys Pro Pro Glu Glu Gln Tyr Asn Ser Thr
        50                  55                  60

Leu Arg Val Val Ser Ile Leu Thr Val Leu His Gln Asp Trp Leu Asn
65                  70                  75                  80

Gly Lys Glu Tyr Lys Cys Lys Val Ser Asn Lys Ala Leu Pro Ala Pro
                85                  90                  95

Ile Glu Lys Thr Ile Ser Lys Ala Lys
                100                 105

<210> SEQ ID NO 27
<211> LENGTH: 107
<212> TYPE: PRT
<213> ORGANISM: Artificial Sequence
<220> FEATURE:
<223> OTHER INFORMATION: Synthetic Construct

<400> SEQUENCE: 27

Gly Gln Pro Arg Glu Pro Gln Val Tyr Thr Leu Pro Pro Ser Arg Glu
1               5                   10                  15

Glu Met Thr Lys Asn Gln Val Ser Leu Thr Cys Leu Val Lys Gly Phe
                20                  25                  30

Tyr Pro Ser Asp Ile Ala Val Glu Trp Glu Ser Asn Gly Gln Pro Glu
            35                  40                  45

Asn Asn Tyr Lys Thr Thr Pro Leu Val Leu Asp Ser Asp Gly Ser Phe
        50                  55                  60

Phe Leu Tyr Ser Lys Leu Thr Val Asp Lys Ser Arg Trp Gln Gln Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Pro Gly Lys
                100                 105

<210> SEQ ID NO 28
<211> LENGTH: 559
<212> TYPE: PRT
<213> ORGANISM: Artificial Sequence
<220> FEATURE:
<223> OTHER INFORMATION: Synthetic Construct

<400> SEQUENCE: 28

Met Asn Pro Asn Gln Lys Ile Thr Thr Ile Gly Ser Ile Cys Leu Val
1               5                   10                  15

Val Gly Leu Ile Ser Leu Ile Leu Gln Ile Gly Asn Ile Ile Ser Ile
                20                  25                  30

Trp Ile Ser His Ser Ile Gln Thr Gly Ser Gln Asn His Thr Gly Ile
            35                  40                  45

Cys Asn Gln Asn Ile Ile Thr Tyr Lys Asn Ser Thr Trp Val Lys Asp
        50                  55                  60

Thr Thr Ser Val Ile Leu Thr Gly Asn Ser Ser Leu Cys Pro Ile Arg
65                  70                  75                  80

-continued

```
Gly Trp Ala Ile Tyr Ser Lys Asp Asn Ser Ile Arg Ile Gly Ser Lys
                 85                  90                  95

Gly Asp Val Phe Val Ile Arg Glu Pro Phe Ile Ser Cys Ser His Leu
            100                 105                 110

Glu Cys Arg Thr Phe Phe Leu Thr Asp Lys Thr His Thr Cys Pro Pro
            115                 120                 125

Cys Pro Ala Pro Glu Leu Leu Gly Gly Pro Ser Val Phe Leu Phe Pro
130                 135                 140

Pro Lys Pro Lys Asp Thr Leu Met Ile Ser Arg Thr Pro Glu Val Thr
145                 150                 155                 160

Cys Val Val Val Asp Val Ser His Glu Asp Pro Glu Val Lys Phe Asn
                165                 170                 175

Trp Tyr Val Asp Gly Val Glu Val His Asn Ala Lys Thr Lys Pro Arg
                180                 185                 190

Glu Glu Gln Tyr Asn Ser Thr Tyr Arg Val Val Ser Val Leu Thr Val
            195                 200                 205

Leu His Gln Asp Trp Leu Asn Gly Lys Glu Tyr Lys Cys Lys Val Ser
        210                 215                 220

Asn Lys Ala Leu Pro Ala Pro Ile Glu Lys Thr Ile Ser Lys Ala Lys
225                 230                 235                 240

Gly Gln Pro Arg Glu Pro Gln Val Tyr Thr Leu Pro Pro Ser Arg Glu
                245                 250                 255

Glu Met Thr Lys Asn Gln Val Ser Leu Thr Cys Leu Val Lys Gly Phe
            260                 265                 270

Tyr Pro Ser Asp Ile Ala Val Glu Trp Glu Ser Asn Gly Gln Pro Glu
            275                 280                 285

Asn Asn Tyr Lys Thr Thr Pro Pro Val Leu Asp Ser Asp Gly Ser Phe
290                 295                 300

Phe Leu Tyr Ser Lys Leu Thr Val Asp Lys Ser Arg Trp Gln Gln Gly
305                 310                 315                 320

Asn Val Phe Ser Cys Ser Val Met His Glu Ala Leu His Asn His Tyr
                325                 330                 335

Thr Gln Lys Ser Leu Ser Leu Ser Pro Gly Lys Gly Gly Pro Ser Val
            340                 345                 350

Phe Leu Phe Pro Pro Lys Pro Lys Asp Thr Leu Met Ile Ser Arg Thr
        355                 360                 365

Pro Glu Val Thr Cys Val Val Val Asp Val Ser His Glu Asp Pro Glu
        370                 375                 380

Val Lys Phe Asn Trp Tyr Val Asp Gly Val Glu Val His Asn Ala Lys
385                 390                 395                 400

Thr Lys Pro Arg Glu Glu Gln Tyr Asn Ser Thr Tyr Arg Val Val Ser
                405                 410                 415

Val Leu Thr Val Leu His Gln Asp Trp Leu Asn Gly Lys Glu Tyr Lys
            420                 425                 430

Cys Lys Val Ser Asn Lys Ala Leu Pro Ala Pro Ile Glu Lys Thr Ile
            435                 440                 445

Ser Lys Ala Lys Gly Gln Pro Arg Glu Pro Gln Val Tyr Thr Leu Pro
450                 455                 460

Pro Ser Arg Glu Glu Met Thr Lys Asn Gln Val Ser Leu Thr Cys Leu
465                 470                 475                 480

Val Lys Gly Phe Tyr Pro Ser Asp Ile Ala Val Glu Trp Glu Ser Asn
                485                 490                 495
```

Gly Gln Pro Glu Asn Asn Tyr Lys Thr Thr Pro Val Leu Asp Ser
            500                 505                 510

Asp Gly Ser Phe Phe Leu Tyr Ser Lys Leu Thr Val Asp Lys Ser Arg
        515                 520                 525

Trp Gln Gln Gly Asn Val Phe Ser Cys Ser Val Met His Glu Ala Leu
    530                 535                 540

His Asn His Tyr Thr Gln Lys Ser Leu Ser Leu Ser Pro Gly Lys
545                 550                 555

<210> SEQ ID NO 29
<211> LENGTH: 1041
<212> TYPE: DNA
<213> ORGANISM: Artificial Sequence
<220> FEATURE:
<223> OTHER INFORMATION: Synthetic Construct

<400> SEQUENCE: 29

| | | |
|---|---|---|
| atgaatccaa atcagaaaat aacaaccatt ggatcaatct gtctggtagt cggactaatt | 60 |
| agcctaatat tgcaaatagg gaatataatc tcaatatgga ttagccattc aattcaaact | 120 |
| ggaagtcaaa accatactgg aatatgcaac caaaacatca ttacctataa aaatagcacc | 180 |
| tgggtaaagg acacaacttc agtgatatta accggcaatt catctctttg tcccatccgt | 240 |
| gggtgggcta tatacagcaa agacaatagc ataagaattg gttccaaagg agacgttttt | 300 |
| gtcataagag agccctttat ttcatgttct cacttggaat gcaggacctt ttttctgacc | 360 |
| gacaaaactc acacatgccc accgtgccca gcacctgaac tcctgggggg accgtcagtc | 420 |
| ttcctcctgc cccaaaaacc caaggacacc ctcatgatct cccggacccc tgaggtcaca | 480 |
| tgcgtggtgg tggacgtgag ccacgaagac cctgaggtca agttcaactg gtacgtggac | 540 |
| ggcgtggagg tgcataatgc caagacaaag ccgcggagg agcagtacaa cagcacgctg | 600 |
| cgtgtggtca gcattctcac cgtcctgcac caggactggc tgaatggcaa ggagtacaag | 660 |
| tgcaaggtct ccaacaaagc cctcccagcc ccatcgaga aaaccatctc caaagccaaa | 720 |
| gggcagcccc gagaaccaca ggtgtacacc ctgcccccat cccgggagga gatgaccaag | 780 |
| aaccaggtca gcctgacctg cctggtcaaa ggcttctatc ccagcgacat cgccgtggag | 840 |
| tgggagagca atgggcagcc ggagaacaac tacaagacca cgcctctggt gctggactcc | 900 |
| gacggctcct tcttcctcta cagcaagctc accgtggaca agagcaggtg gcagcagggg | 960 |
| aacgtcttct catgctccgt gatgcacgag gctctgcaca accactacac gcagaagagc | 1020 |
| ctctccctgt ctccgggtaa a | 1041 |

<210> SEQ ID NO 30
<211> LENGTH: 1047
<212> TYPE: DNA
<213> ORGANISM: Artificial Sequence
<220> FEATURE:
<223> OTHER INFORMATION: Synthetic Construct

<400> SEQUENCE: 30

| | | |
|---|---|---|
| atgaatccaa atcagaaaat aacaaccatt ggatcaatct gtctggtagt cggactaatt | 60 |
| agcctaatat tgcaaatagg gaatataatc tcaatatgga ttagccattc aattcaaact | 120 |
| ggaagtcaaa accatactgg aatatgcaac caaaacatca ttacctataa aaatagcacc | 180 |
| tgggtaaagg acacaacttc agtgatatta accggcaatt catctctttg tcccatccgt | 240 |
| gggtgggcta tatacagcaa agacaatagc ataagaattg gttccaaagg agacgttttt | 300 |
| gtcataagag agccctttat ttcatgttct cacttggaat gcaggacctt ttttctgacc | 360 |

```
gacaaaactc acacatgccc accgtgccca gcacctgaac tcctgggggg accggatgtc    420
ttcctcttcc ccccaaaacc caaggacacc ctcatgatct cccggacccc tgaggtcaca    480
tgcgtggtgg tggacgtgag ccacgaagac cctgaggtca agttcaactg gtacgtggac    540
ggcgtggagg tgcataatgc caagacaaag ccgcgggagg agcagtacaa cagcacgtac    600
cgtgtggtca gcgtcctcac cgtcctgcac caggactggc tgaatggcaa ggagtacaag    660
tgcaaggtct ccaacaaagc cctcccactg cccgaagaga aaaccatctc caaagccaaa    720
gggcagcccc gagaaccaca ggtgtacacc ctgcccccat cccgggagga tgaccaag     780 aaccaggtca gcctgacctg cctggtcaaa ggcttctatc ccagcgacat cgccgtggag    840
tgggagagca atgggcagcc ggagaacaac tacaagacca cgcctcccgt gctggactcc    900
gacggctcct tcttcctcta cagcaagctc accgtggaca agagcaggtg gcagcagggg    960
aacgtcttct catgctccgt gatgcacgag gctctgcaca accactacac gcagaagagc   1020 ctctcccctgt ctccgggtaa ataataa                                       1047

<210> SEQ ID NO 31
<211> LENGTH: 1722
<212> TYPE: DNA
<213> ORGANISM: Artificial Sequence
<220> FEATURE:
<223> OTHER INFORMATION: Synthetic Construct

<400> SEQUENCE: 31
atgaatccaa atcagaaaat aacaaccatt ggatcaatct gtctggtagt cggactaatt     60
agcctaatat tgcaaatagg gaatataatc tcaatatgga ttagccattc aattcaaact    120
ggaagtcaaa accatactgg aatatgcaac caaaacatca ttacctataa aaatagcacc    180
tgggtaaagg acacaacttc agtgatatta accggcaatt catctctttg tcccatccgt    240
gggtgggcta tatacagcaa agacaatagc ataagaattg gttccaaagg agacgttttt    300
gtcataagag agcccttat ttcatgttct cacttggaat gcaggacctt ttttctgacc    360
gacaaaactc acacatgccc accgtgccca gcacctgaac tcctgggggg accgtcagtc    420
ttcctcttcc ccccaaaacc caaggacacc ctcatgatct cccggacccc tgaggtcaca    480
tgcgtggtgg tggacgtgag ccacgaagac cctgaggtca agttcaactg gtacgtggac    540
ggcgtggagg tgcataatgc caagacaaag ccgcgggagg agcagtacaa cagcacgtac    600
cgtgtggtca gcgtcctcac cgtcctgcac caggactggc tgaatggcaa ggagtacaag    660
tgcaaggtct ccaacaaagc cctcccagcc cccatcgaga aaaccatctc caaagccaaa    720
gggcagcccc gagaaccaca ggtgtacacc ctgcccccat cccgggagga tgaccaag     780 aaccaggtca gcctgacctg cctggtcaaa ggcttctatc ccagcgacat cgccgtggag    840
tgggagagca atgggcagcc ggagaacaac tacaagacca cgcctcccgt gctggactcc    900
gacggctcct tcttcctcta cagcaagctc accgtggaca agagcaggtg gcagcagggg    960
aacgtcttct catgctccgt gatgcacgag gctctgcaca accactacac gcagaagagc   1020 ctctcccctgt ctccgggtaa agacaaaact cacacatgcc caccgtgccc agcacctgaa   1080
ctcctggggg gaccggatgt cttcctcttc ccccaaaac caaggacac cctcatgatc    1140 tcccggaccc ctgaggtcac atgcgtggtg gtggacgtga gccacgaaga ccctgaggtc   1200
aagttcaact ggtacgtgga cggcgtggag gtgcataatg ccaagacaaa gccgcgggag   1260
gagcagtaca acagcacgta ccgtgtggtc agcgtcctca ccgtcctgca ccaggactgg   1320
```

```
ctgaatggca aggagtacaa gtgcaaggtc tccaacaaag ccctcccact gcccgaagag    1380
aaaaccatct ccaaagccaa agggcagccc cgagaaccac aggtgtacac cctgccccca    1440
tcccgggagg agatgaccaa gaaccaggtc agcctgacct gcctggtcaa aggcttctat    1500
cccagcgaca tcgccgtgga gtgggagagc aatgggcagc cggagaacaa ctacaagacc    1560
acgcctcccg tgctggactc cgacggctcc ttcttcctct acagcaagct caccgtggac    1620
aagagcaggt ggcagcaggg gaacgtcttc tcatgctccg tgatgcacga ggctctgcac    1680
aaccactaca cgcagaagag cctctccctg tctccgggta aa                       1722
```

COMPOSITIONS AND METHODS FOR STIMULATING NATURAL KILLER CELLS

This application claims the benefit of U.S. Provisional Application No. 62/796,575, filed on Jan. 24, 2019, which is incorporated herein by reference in its entirety.

FIELD

The present disclosure relates to compositions and methods for stimulating Natural Killer (NK) cells.

BACKGROUND

Natural killer (NK) cell therapy is emerging as a treatment approach for cancer and potentially for other diseases. Challenges to fully realizing the clinical potential of NK cell therapy include obtaining large numbers of robust, healthy NK cells that exhibit high tumor cell cytotoxicity; ability to target the NK cells to a disease target; and, once introduced to a patient, having the NK cells sufficiently persist in vivo to achieve a therapeutic effect. This challenges are attributable in part to the fact that NK cell activity is tightly regulated by a balance of activating and inhibitory receptors including immune checkpoints. For example, ligands for activating NK cell receptors are only expressed on stressed, transformed or virally infected cells, so that NK cell cytotoxic activity targets such cells and spares normal, healthy tissue. NK cell cytotoxic activity is further restricted by inhibitory ligands expressed on "self" cells. At the same time, the inhibitory regulatory mechanisms controlling NK cell cytotoxicity can be a route of attack by tumor cells which deploy a variety of immune suppressive interactions to prevent immune attack. An example of how NK cells resist tumor immunosuppression is the engagement of target cells marked with antibodies to elicit antibody-dependent cell cytotoxicity (ADCC) in NK cells. As a result, the success of many newer anti-tumor antibodies is dependent on the presence of larger numbers of healthy NK cells in the patient to support anti-tumor activity. Overall, need remains in the field of NK cell therapy for approaches to obtaining healthy NK cells in numbers, and stimulating NK cells to attain higher cytotoxicity, and/or better ADCC functionality.

SUMMARY

Among the various aspects of the present disclosure is a feeder cell composition comprising at least one feeder cell comprising a fragment crystallizable (Fc) domain bound to an external surface of the feeder cell. In some aspects, the at least one feeder cell further comprises one or more NK cell effector agents. In certain aspects, the at least one feeder cell comprises at least one NK cell effector agent, wherein the NK cell effector agent is IL-21. In another aspect, the at least one feeder cell further comprises at least two NK cell effector agents, wherein one of the at least two NK cell effector agents is IL-21.

Also disclosed herein are NK cell expanding compositions free of feeder cells, comprising an engineered particle comprising an Fc domain bound to an external surface of the engineered particle of any preceding aspect. In some aspects, the engineered particle further comprises one or more NK cell effector agents. In some aspects, an engineered particle further comprises at least one NK cell effector agent, wherein the NK cell effector agent is IL-21. In another aspect, the engineered particle further comprises at least two NK cell effector agents, wherein one of the at least two NK cell effector agents is IL-21.

In one aspect of the present disclosure is a therapeutic dose of NK cells comprising a plurality of NK cells expanded in vitro, combined with an NK cell expanding composition, the composition being free of feeder cells and comprising at least one engineered particle, which comprises an Fc domain bound to an external surface of the engineered particle. In some aspects, the engineered particle further comprises one or more NK cell effector agents. In some aspects, the engineered particle further comprises at least one NK cell effector agent, wherein the NK cell effector agent is IL-21. In another aspect, the engineered particle further comprises at least two NK cell effector agents, wherein one of the at least two NK cell effector agents is IL-21.

In one aspect of the present disclosure is an expanded population of NK cells exposed in vitro to an NK cell expanding composition, the composition being free of feeder cells and comprising at least one of the engineered plasma membrane (PM) particles as disclosed herein. In another aspect of the present disclosure is an expanded population of NK cells exposed in vitro to an NK cell expanding composition, the composition comprising at least one feeder cell comprising an Fc domain bound to an external surface of the feeder cell as disclosed herein. Such methods optionally further comprise exposing the NK cells to one or more NK cell effector agents. One or more cell effector agents may be in solution in a cell medium, and/or bound to the surface of an Fc-bound feeder cell or engineered PM particles as disclosed herein.

Also disclosed herein are methods of treating, ameliorating, reducing, and/or inhibiting a cancer or metastasis or an infectious disease comprising administering to a subject in need thereof an effective amount of the any of the disclosed NK cell expanding compositions or an NK cell expanding infusion formulation of any preceding aspect. In one aspect, the NK cell expanding compositions or NK cell expanding infusion formulations can be combined or concurrently administered with a therapeutic agent, such as, for example, an anti-cancer therapeutic agent or an antiviral or antibiotic agent.

In one aspect of the present disclosure is a method of preventing, reducing, mitigating, and/or inhibiting a cancer relapse or metastasis before or after stem cell transplant, the method comprising administering to a subject in need thereof an effective amount of any of the disclosed expanded population of NK cells, which have been exposed in vitro to an NK cell expanding composition, or to NK cell stimulating compositions, or any disclosed NK cell stimulating or expanding infusion formulation. Any of the disclosed NK cell stimulating or expanding compositions or formulations may be administered in combination with stem cell transplantation, or separately.

In one aspect of the present disclosure is a method of modulating T cell repertoire comprising administering to a subject in need thereof an effective amount of any of the disclosed expanded population of NK cells which have been exposed in vitro to an NK cell expanding composition, or any disclosed NK cell expanding infusion formulation.

In one aspect of the present disclosure is a method of preventing, inhibiting, reducing, or mitigating acute or chronic graft-vs-host disease comprising administering to a subject in need thereof an effective amount of any of the disclosed expanded population of NK cells that have been exposed in vitro to an NK cell expanding composition, or to NK cell expanding compositions or any disclosed NK cell expanding infusion formulation.

In one aspect, disclosed herein are methods of any preceding aspect, wherein the sources of NK cells to be expanded or stimulated may include peripheral blood (PBMCs, apheresis, leukopaks, buffy coats), iPSC derived NK cells, ESC derived NK cells, NK cells having polymorphism of high affinity Fc receptor having Phe or Val at 158, and gene modified NK cells.

Other aspects and features of the disclosure are detailed below.

BRIEF DESCRIPTION OF THE DRAWINGS

FIGS. 1A and 1B show the construction of a membrane-bound immune cell targeting ligand comprising an uncleaved signal anchor. FIG. 1A shows the structure of Type I and Type II integral membrane proteins that differ in the orientation with respect to their N- and C-termini. FIG. 1B shows the structure of the NA-Fc chimeric protein used as the membrane bound immune cell targeting ligand consisting of the neuraminidase transmembrane domain which serves as a membrane anchor, stalk region and human IgG' Fc region.

DETAILED DESCRIPTION

Figure 2:
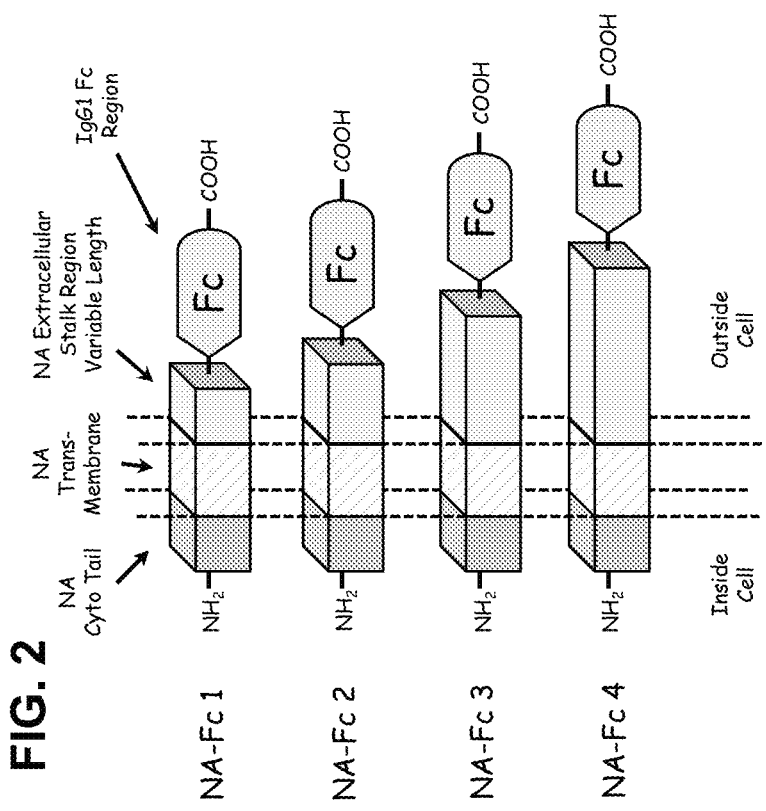
FIG. 2 shows alternative constructions of membrane bound immune cell targeting ligands comprising an Fc domain comprising a neuraminidase (NA) signal anchor and increasing NA stalk lengths.

The present disclosure provides compositions and formulations comprising NK cell stimulatory agents, and related methods of their use to stimulate NK cells and in various treatments as described in further detail below.

Engaging CD16 receptor (FcγRIIIa receptor (CD16a) and FcγRIIIb receptor (CD16b)) on NK cells is potentially a very potent mechanism for NK cell stimulation. The Fc (fragment crystallizable region) domain of an antibody is recognized by CD16, and binding of the Fc domain to CD16 elicits antibody-dependent cell cytotoxicity (ADCC). The present disclosure describes engineered stimulation of NK cells via CD16 engagement to improve NK cell expansion and enhance NK cell cytotoxicity. Put differently, the present disclosure contemplates stimulating NK cells using the Fc domain of an antibody, wherein the Fc domain is competent for agonizing CD16 on NK cells, and is presented to NK cells with the Fc domain bound to a feeder cell, a plasma membrane (PM) particle, an exosome (EX), or to a solid support. Fc-bound feeder cells, PM particles, exosomes and solid supports may further comprise or be combined with other NK cell stimulating factors in various forms such as membrane bound or soluble IL-15, IL-21, 4-1BBL, other cytokines, or other chemical moieties that simultaneously engage other stimulatory or inhibitory receptors, and corresponding signaling pathways. NK cells expanded according to the methods and using the compositions disclosed herein can exhibit higher cytotoxicity, higher expression of CD16, and/or improved ADCC functionality. Such NK cells are useful in therapeutic compositions and methods for treating human diseases and conditions including cancers of multiple types.

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd Ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them unless specified otherwise.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

As used herein, "N-terminal side" or "amino terminal end" refers to directionality of a peptide, polypeptide, or protein and may not mean the N-terminus. In some aspects, where a chimeric or fusion peptide, polypeptide, or protein is discussed, the N-terminal side may refer only to a component of the chimeric or fusion peptide, polypeptide, or protein and not the entire structure. For example, where a Fc domain is discussed, and the Fc domain is described as fused with its amino terminal end or N-terminal side facing intracellularly, contemplated herein are chimeric or fusion peptides, polypeptides, or proteins wherein the signal anchor is at the N-terminus of the chimeric or fusion construct and actually spans the cellular membrane. Thus, in such a chimera, the trans-membrane anchor is attached to the amino terminal side of the Fc domain, with the directionality of the Fc domain has the N-terminal side facing the cell which is inverted relative to an Fc domain on a typical B cell which would typically have the carboxy end spanning the cellular membrane and amino terminal end extending to the extracellular matrix.

The terms "peptide," "polypeptide" and "protein" are used interchangeably to refer to a polymer of amino acid residues.

The term "sequence identity" as used herein, indicates a quantitative measure of the degree of identity between two sequences of substantially equal length. The percent identity of two sequences, whether nucleic acid or amino acid sequences, is the number of exact matches between two aligned sequences divided by the length of the shorter sequence and multiplied by 100. An approximate alignment for nucleic acid sequences is provided by the local homology algorithm of Smith and Waterman, Advances in Applied Mathematics 2:482-489 (1981). This algorithm can be applied to amino acid sequences by using the scoring matrix developed by Dayhoff, Atlas of Protein Sequences and Structure, M. O. Dayhoff ed., 5 suppl. 3:353-358, National Biomedical Research Foundation, Washington, D.C., USA, and normalized by Gribskov, Nucl. Acids Res. 14(6):6745-6763 (1986). An exemplary implementation of this algorithm to determine percent identity of a sequence is provided by the Genetics Computer Group (Madison, Wis.) in the "BestFit" utility application. Other suitable programs for calculating the percent identity or similarity between sequences are generally known in the art, for example, another alignment program is BLAST, used with default parameters. For example, BLASTN and BLASTP can be used using the following default parameters: genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+Swiss protein+Spupdate+PIR. Details of these programs can be found on the GenBank website. In general, the substitutions are conservative amino acid substitutions: limited to exchanges within members of group 1: glycine, alanine, valine, leucine, and Isoleucine; group 2: serine, cysteine, threonine, and methionine; group 3: proline; group 4: phenylalanine, tyrosine, and tryptophan; group 5: aspartate, glutamate, asparagine, and glutamine.

Techniques for determining nucleic acid and amino acid sequence identity are known in the art. Typically, such techniques include determining the nucleotide sequence of the mRNA for a gene and/or determining the amino acid sequence encoded thereby, and comparing these sequences to a second nucleotide or amino acid sequence. Genomic sequences can also be determined and compared in this fashion. In general, identity refers to an exact nucleotide-to-nucleotide or amino acid-to-amino acid correspondence of two polynucleotides or polypeptide sequences, respectively. Two or more sequences (polynucleotide or amino acid) can be compared by determining their percent identity.

As various changes could be made in the above-described cells and methods without departing from the scope of the invention, it is intended that all matter contained in the above description and in the examples given below, shall be interpreted as illustrative and not in a limiting sense.

An "increase" can refer to any change that results in a greater amount of a symptom, disease, composition, condition or activity. An increase can be any individual, median, or average increase in a condition, symptom, activity, composition in a statistically significant amount. Thus, the increase can be a 1, 2, 3, 4, 5, 6, 7, 8, 9, 10, 15, 20, 25, 30, 35, 40, 45, 50, 55, 60, 65, 70, 75, 80, 85, 90, 95, or 100% increase so long as the increase is statistically significant.

A "decrease" can refer to any change that results in a smaller amount of a symptom, disease, composition, condition, or activity. A substance is also understood to decrease the genetic output of a gene when the genetic output of the gene product with the substance is less relative to the output of the gene product without the substance. Also for example, a decrease can be a change in the symptoms of a disorder such that the symptoms are less than previously observed. A decrease can be any individual, median, or average decrease in a condition, symptom, activity, composition in a statistically significant amount. Thus, the decrease can be a 1, 2, 3, 4, 5, 6, 7, 8, 9, 10, 15, 20, 25, 30, 35, 40, 45, 50, 55, 60, 65, 70, 75, 80, 85, 90, 95, or 100% decrease so long as the decrease is statistically significant.

"Inhibit," "inhibiting," and "inhibition" mean to decrease an activity, response, condition, disease, or other biological parameter. This can include but is not limited to the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

By "reduce" or other forms of the word, such as "reducing" or "reduction," is meant lowering of an event or characteristic (e.g., tumor growth). It is understood that this is typically in relation to some standard or expected value, in other words it is relative, but that it is not always necessary for the standard or relative value to be referred to. For example, "reduces tumor growth" means reducing the rate of growth of a tumor relative to a standard or a control.

By "prevent" or other forms of the word, such as "preventing" or "prevention," is meant to stop a particular event or characteristic, to stabilize or delay the development or progression of a particular event or characteristic, or to minimize the chances that a particular event or characteristic will occur. Prevent does not require comparison to a control as it is typically more absolute than, for example, reduce. As used herein, something could be reduced but not prevented, but something that is reduced could also be prevented. Likewise, something could be prevented but not reduced, but something that is prevented could also be reduced. It is understood that where reduce or prevent are used, unless specifically indicated otherwise, the use of the other word is also expressly disclosed.

The term "subject" refers to any individual who is the target of administration or treatment. The subject can be a vertebrate, for example, a mammal. In one aspect, the subject can be human, non-human primate, bovine, equine, porcine, canine, or feline. The subject can also be a guinea pig, rat, hamster, rabbit, mouse, or mole. Thus, the subject can be a human or veterinary patient. The term "patient" refers to a subject under the treatment of a clinician, e.g., physician.

The term "therapeutically effective" refers to the amount of the composition used is of sufficient quantity to ameliorate one or more causes or symptoms of a disease or disorder. Such amelioration only requires a reduction or alteration, not necessarily elimination.

The term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

"Administration" to a subject includes any route of introducing or delivering to a subject an agent. Administration can be carried out by any suitable route, including oral, topical, intravenous, subcutaneous, transcutaneous, transdermal, intramuscular, intra-joint, parenteral, intra-arteriole, intradermal, intraventricular, intracranial, intraperitoneal, intralesional, intranasal, rectal, vaginal, by inhalation, via an implanted reservoir, parenteral (e.g., subcutaneous, intravenous, intramuscular, intra-articular, intra-synovial, intrasternal, intrathecal, intraperitoneal, intrahepatic, intralesional, and intracranial injections or infusion techniques), and the like. "Concurrent administration", "administration in combination", "simultaneous administration" or "administered simultaneously" as used herein, means that the compounds are administered at the same point in time or essentially immediately following one another. In the latter case, the two compounds are administered at times sufficiently close that the results observed are indistinguishable from those achieved when the compounds are administered at the same point in time. "Systemic administration" refers to the introducing or delivering to a subject an agent via a route which introduces or delivers the agent to extensive areas of the subject's body (e.g. greater than 50% of the body), for example through entrance into the circulatory or lymph systems. By contrast, "local administration" refers to the introducing or delivery to a subject an agent via a route which introduces or delivers the agent to the area or area immediately adjacent to the point of administration and does not introduce the agent systemically in a therapeutically significant amount. For example, locally administered agents are easily detectable in the local vicinity of the point of administration, but are undetectable or detectable at negligible amounts in distal parts of the subject's body. Administration includes self-administration and the administration by another.

"Treat," "treating," "treatment," and grammatical variations thereof as used herein, include the administration of a composition with the intent or purpose of partially or completely preventing, delaying, curing, healing, alleviating, relieving, altering, remedying, ameliorating, improving, stabilizing, mitigating, and/or reducing the intensity or frequency of one or more a diseases or conditions, a symptom of a disease or condition, or an underlying cause of a disease or condition. Treatments according to the invention may be applied preventively, prophylactically, palliatively or remedially. Prophylactic treatments are administered to a subject prior to onset (e.g., before obvious signs of cancer), during early onset (e.g., upon initial signs and symptoms of cancer), or after an established development of cancer. Prophylactic administration can occur for day(s) to years prior to the manifestation of symptoms of a disease or an infection.

(I) Fc Fusion Peptides

In one aspect, disclosed herein are engineered feeder cells, engineered plasma membrane (PM) particles, engineered exosomes, engineered platelets (including, but not limited to Fc bound platelets), and engineered lymphocytes (such as, for example lymphocytes (such as T cells) engineered to express Fc domains to stimulate NK cells), and solid supports comprising a membrane bound Fc fusion peptide (referred to herein as Fc-bound feeder cells, Fc-bound PM particles, Fc-bound exosomes, Fc-bound platelets, and Fc-bound lymphocytes, respectively) wherein the Fc fusion peptide comprises a transmembrane peptide domain linked to the amino terminus of an Fc domain. In one aspect, the transmembrane domain of the Fc fusion peptide can comprise a cleaved or uncleaved signal anchor sequence such as the transmembrane domain of neuraminidase, the signal-anchor from parainfluenza virus hemagglutinin-neuraminidase, the signal-anchor from the transferrin receptor, the signal-anchor from the MHC class II invariant chain, the signal-anchor from P glycoprotein, the signal-anchor from asialoglycoprotein receptor, or the signal-anchor from a neutral endopeptidase. In one example, the transmembrane domain comprises a parainfluenza virus hemagglutinin-neuraminidase (NA) peptide sequence. As shown schematically in FIG. 1, the transmembrane neuraminidase (NA) peptide domain is used to couple or bind the Fc domain to the external surface of a feeder cell. In other aspects, the transmembrane neuraminidase (NA) peptide domain is used to couple or bind the Fc domain to the external surface of a PM nanoparticle, exosome or a solid support. The NA peptide domain consists of the N-terminal cytoplasmic tail, an uncleaved signal-anchor which serves as a transmembrane domain, and a stalk region which extends from the plasma membrane. It will be understood that the length of the stalk region can be varied.

As used herein, "NA peptide domain" refers to a peptide sequence comprising at least the fifty (50) amino acid sequence of SEQ ID NO: 1 MNPNQKITTIGSICLVVGLISLILQIGNIISIWISHSIQTGSQNHTGICN, or a sequence having at least about 81%, 82%, 83%, 84%, 85%, 86%, 87%, 88%, 89%, 90%, 91%, 92%, 93%, 94%, 95%, 96%, 97%, 98, or 99% sequence identity with SEQ ID NO: 1.

The Fc domain is the ligand to which the NK surface receptor CD16 (Fc γRIII) binds. CD16 is one of the primary receptors on NK cells and when CD16 binds to the Fc portion of an antibody (for example, an IgG1, IgG2, IgG3, and/or IgG4 Fc domain), this activates the NK cells antibody-dependent cell mediated cytotoxicity (ADCC). In another aspect, Fc domain (IgG1, IgG2, IgG3, and/or IgG4 can also bind the CD16 receptor on other immune cells, such as mast cells, macrophages, gamma-delta T cells; and will thereby similarly stimulate expansion and enhance cytotoxicity of such cells. In another aspect, other types of cells can be engineered to be Fc-bound. The present disclosure thus also encompasses, for example, Fc-bound engineered platelets, Fc-bound primary tumor samples which can be used for tumor vaccines, and engineered iPSCs expressing Fc.

In another aspect, other Fc immunoglobulin isotypes (IgA, IgE, IgM) other than IgG, could be used to stimulate the respectively corresponding different Fc receptors for stimulation of other immune cell types. For example, the domain FcαRI (CD89) specifically binds to IgA on macrophages, neutrophils, eosinophils; FcγRI (CD64) specifically binds to IgG on monocytes and macrophages; and FcεRII (CD23) specifically binds to IgE on B cells. Fc binds to CD64 on monocytes or macrophages and thus stimulates them. Thus, the fusion peptides, Fc-bound feeder cells (FCs), Fc bound lymphocytes, Fc-bound engineered plasma membrane (PM) particles, Fc-bound engineered exosomes and compositions containing them can also be used to expand mast cells and/or macrophages substantially according to the methods described herein for expanding NK cells.

In one aspect, disclosed herein are fusion peptides comprising an immunoglobulin Fc domain (for example, an IgG1, IgG2, IgG3, IgG4, IgA and/or IgE Fc domain) fused to a transmembrane domain, for example an NA peptide domain, as described above. The Fc domain(s) can be presented as a monomeric, dimeric, or multimeric construct. In one aspect, the Fc domain(s) can be further modified to optimize or enhance antibody mediated killing, NK cell recognition, and control expansion of activating Fc receptors. For example, the Fc domain(s) can be modified to increase affinity for CD16. Thus, for example, the Fc domain(s) may comprise one or more mutations such as, for example, T256A, K290A, S298A, E333A, K334A, L235V, F243L, R292P, Y300L, and/or P396L. Similarly, the Fc domain(s) can be further modified to increase selectivity of binding to the activating (IIIa) vs, inhibitory Fc(IIb) receptor. Thus, for example, the Fc domain(s) may comprise one, two, three, four, five, six, seven, eight or more mutations or alternative forms such as, for example, S239D, I332E, A330L, F243L, R292P, V305I, and/or P396L. For example, in one aspect, the Fc domain can be modified to comprise R292L, Y300L, V305I, and P396L. In another example, the Fc domain can be modified to comprise S239D, I332E, and A330L. In another aspect, engineered mutants of Fc domains having lower affinity could be used to elicit higher expression of CD16 on NK cells.

The transmembrane domain, for example an NA peptide domain can be linked directly to the Fc domain via a chemical bond, or indirectly via a linker. A direct chemical bond is for example a covalent bond (e.g., peptide bond, ester bond, or the like), or alternatively, a non-covalent bond (e.g., ionic, electrostatic, hydrogen, hydrophobic, Van der Waal interactions, or π-effects). An indirect link can be achieved using a linker, i.e., a chemical group that connects one or more other chemical groups via at least one covalent bond. Suitable linkers include amino acids, peptides, nucleotides, nucleic acids, dimeric hinged Fc, organic linker molecules (e.g., maleimide derivatives, N-ethoxybenzylimidazole, biphenyl-3,4',5-tricarboxylic acid, p-aminobenz - yloxycarbonyl, and the like), disulfide linkers, and polymer linkers (e.g., PEG). The linker can include one or more spacing groups including, but not limited to alkylene, alkenylene, alkynylene, alkyl, alkenyl, alkynyl, alkoxy, aryl, heteroaryl, aralkyl, aralkenyl, aralkynyl and the like. The linker can be neutral, or carry a positive or negative charge. Additionally, the linker can be cleavable such that the linker's covalent bond that connects the linker to another chemical group can be broken or cleaved under certain conditions, including pH, temperature, salt concentration, light, a catalyst, or an enzyme. In one aspect, the NA peptide domain can be an NA4-Fc Siadel (S239D/I332E/A330L)

In one aspect, the linker may be a peptide linker. Examples of suitable peptide linkers are well known in the art, and programs to design linkers are readily available (see, e.g., Crasto et al., Protein Eng., 2000, 13(5):309-312). The peptide linker can be a restriction site linker such as the short sequence RS, or a flexible amino acid linker (e.g., comprising small, non-polar or polar amino acids). Non-limiting examples of flexible linkers include LEGGGS (SEQ ID NO: 2), TGSG (SEQ ID NO: 3), GGSGGGSG (SEQ ID NO: 4), $(GGGGS)_{1-4}$ (SEQ ID NO: 5), GGGS (SEQ ID NO: 6) 1-4, GSGGGG (SEQ ID NO: $7)_{1-4}$, and $(Gly)_{6\_8}$. Alternatively, the peptide linker can be a rigid amino acid linker. Such linkers include $(EAAAK)_{1-4}$ (SEQ ID NO: 8), $A(EAAAK)_{2-5}A$ (SEQ ID NO: 9), PAPAP (SEQ ID NO: 10), and $(AP)_{6-8}$. The Fc domain domain can be linked to the N-terminus, the C-terminus, and/or to an internal location of the NA peptide.

In some aspects, the Fc fusion peptide has an amino acid sequence having at least about 80%, 81%, 82%, 83%, 84%, 85%, 86%, 87%, 88%, 89%, 90%, 91%, 92%, 93%, 94%, 95%, 96%, 97%, 98, or 99% sequence identity with SEQ ID NOS:13. To target placement of the Fc domain on the plasma membrane, membrane targeting domain from the well characterized influenza virus neuraminidase protein (NA) can be used which consists of the N-terminal cytoplasmic tail, an uncleaved signal-anchor which serves as a transmembrane domain, and a stalk region which extends from the plasma membrane. FIGS. 1A and 1B are schematics showing the construction of a membrane bound immune cell targeting ligand comprising an uncleaved signal anchor sequence. FIG. 1A shows the structure of Type I and Type II integral membrane proteins and the signal anchors for each. FIG. 1B shows the structure of the uncleaved signal anchor from a Type II integral membrane protein used in the membrane bound immune cell targeting ligand. As shown in FIG. 1B, an exemplary but non-limiting construct according to the present disclosure is comprised of an NA-Fc chimera where the Fc domain (IgG1) is linked via a short linker to the uncleaved NA stalk region. Notably, the NA-Fc chimera can be inserted into recombinant P/V/F virus to generate a novel oncolytic virus which is specific for tumor versus normal cells (due to PN mutations) and can enhance ADCC by NK cells. FIG. 2 shows alternative constructions of an NA-Fc chimera with increasing NA stalk lengths.

Figure 3:
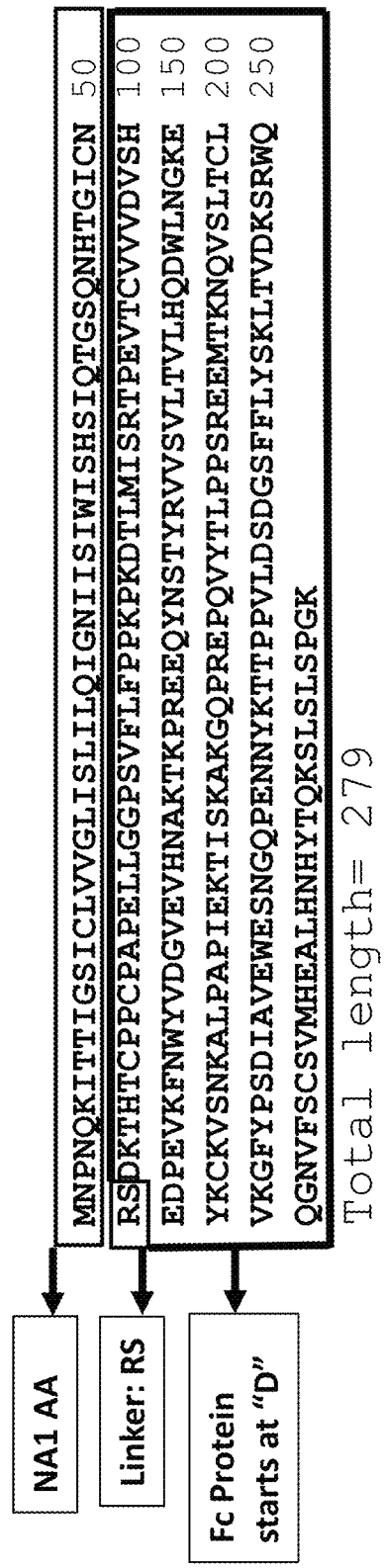
FIG. 3 shows an example of a membrane bound immune cell targeting ligand sequence (SEQ ID NO: 13), with an NA signal anchor fused to an IgG Fc domain by an RS linker.

FIG. 3 shows one example sequence of an NA-Fc chimera, with the Fc domain (IgG1) linked by the short RS linking sequence to a 50 amino acid NA sequence, to produce the non-limiting example of an NA-Fc construct having the 279 amino acid sequence set forth below and shown in FIG. 3:

MNPNQKITTIGSICLVVGLISLILQIGNIISIWISH-SIQTGSQNHTGICNRSDK THTCPPCPAPELLGGP-SVFLFPPKPKDTLMISRTPEVTCVWDVSHEDPE-VKFNWYVD GVEVHNAKTKPREEQYNSTYRVVSV-LTVLHQDWLNGKEYKCKVSNKALPAPIEKTISK AKGQPREPQVYTLPPSREEMTKNQVSLTCLVKG-FYPSDIAVEWESNGQPENNYKTTP PVLDSDGSFFLY-SKLTVDKSRWQQGNVFSCSVMHEALHNHYTQKS-LSLSPGK (SEQ ID NO: 13). As noted in FIG. 2, the NA-Fc construct can comprise the NA targeting domain (SEQ ID NO: 1), a linker (for example an RS linker), a hinge region DKTHTCPPCPAPELL (SEQ ID NO: 11) or TCPPCPA-PELL (SEQ ID NO: 12), and an Fc region GGPSVFLFPPKPKDTLMISRTPEVTCVVVDVSHEDPE-VKFNWYVDGVEVHNAKTKPR EEQYNSTYRVVS-VLTVLHQDWLNGKEYKCKVSNKALPAPIEKTISKAK-GQPREPQVYT LPPSREEMTKNQVSLTCLVKGFYPS-DIAVEWESNGQPENNYKTTPPVLDSDGSFFLYS KLTVDKSRWQQGNVFSCSVMHEALHNHYTQKSLSL-SPGK (SEQ ID NO: 14) comprising a CH2 domain GGPSVFLFPPKPKDTLMISRTPEVTCVVVDVSHEDPE-VKFNWYVDGVEVHNAKTKPR EEQYNSTYRVVS-VLTVLHQDWLNGKEYKCKVSNKALPAPIEKTISKAK (SEQ ID NO: 15) and a CH3 domain GQPREPQVYTLPPS-REEMTKNQVSLTCLVKGFYPSDIAVEWESNGQPEN-NYKTTPPV LDSDGSFFLYSKLTVDKSRWQQGNVF-SCSVMHEALHNHYTQKSLSLSPGK (SEQ ID NO: 16) or a sequence having at least about 81%, 82%, 83%, 84%, 85%, 86%, 87%, 88%, 89%, 90%, 91%, 92%, 93%, 94%, 95%, 96%, 97%, 98, or 99% sequence identity with SEQ ID NO: 14, 15, or 16. It is understood and herein contemplated that an NA-Fc chimera can include any length of the membrane targeting domain from the well characterized influenza virus neuraminidase protein (NA) including MNPNQKITTIGSICLVVGLISLILQIGNIISIWISHSIQT-GSQNHTGICNQNIITYKNSTWVKD TTSVILTGNSS-LCPIRGWAIYSKDNSIRIGSKGDVFVIREPFISCSHLE-CRTFFLT (SEQ ID NO: 17) or a sequence having at least about 81%, 82%, 83%, 84%, 85%, 86%, 87%, 88%, 89%, 90%, 91%, 92%, 93%, 94%, 95%, 96%, 97%, 98, or 99% sequence identity with SEQ ID NO: 17. In one aspect, the NA-Fc fusion can comprise MNPNQKITTIGSICLVVG-LISLILQIGNIISIWISHSIQTGSQNHTGICNQNIITYK-NSTWVKD TTSVILTGNSSLCPIRGWAIYSKDNSIRIG-SKGDVFVIREPFISCSHLECRTFFLTDKTHT CPPCPA-PELLGGPSVFLFPPKPKDTLM ISRTPEVTCVVVDV-SHEDPEVKFNVVYVDGVE VHNAKTKPREEQYN-STYRVVSVLTVLHQDWLNGKEYKCKVSNKALPA-PIEKTISKAKG QPREPQVYTLPPSREEMTKNQVSLT-CLVKGFYPSDIAVEWESNGQPENNYKTTPPVL DSDGSFFLYSKLTVDKSRWQQGNVFSCSVMHEA-LHNHYTQKSLSLSPGK (SEQ ID NO: 18), which is encoded by the nucleic acid sequence (SEQ ID NO: 19)
ATGAATCCAAATCAGAAAATAACAACCATTGGATCAATCTGTCTGGTAGT

CGGACTAATTAGCCTAATATTGCAAATAGGGAATATAATCTCAATATGGA

TTAGCCATTCAATTCAAACTGGAAGTCAAAACCATACTGGAATATGCAAC

CAAAACATCATTACCTATAAAAATAGCACCTGGGTAAAGGACACAACTTC

AGTGATATTAACCGGCAATTCATCTCTTTGTCCCATCCGTGGGTGGGCTA

TATACAGCAAAGACAATAGCATAAGAATTGGTTCCAAAGGAGACGTTTTT

GTCATAAGAGAGCCCTTTATTTCATGTTCTCACTTGGAATGCAGGACCTT

TTTTCTGACCGACAAAACTCACACATGCCCACCGTGCCCAGCACCTGAAC

TCCTGGGGGGACCGTCAGTCTTCCTCTTCCCCCCAAAACCCAAGGACACC

CTCATGATCTCCCGGACCCCTGAGGTCACATGCGTGGTGGTGGACGTGAG

CCACGAAGACCCTGAGGTCAAGTTCAACTGGTACGTGGACGGCGTGGAGG

TGCATAATGCCAAGACAAAGCCGCGGGAGGAGCAGTACAACAGCACGTAC

CGTGTGGTCAGCGTCCTCACCGTCCTGCACCAGGACTGGCTGAATGGCAA

GGAGTACAAGTGCAAGGTCTCCAACAAAGCCCTCCCAGCCCCCATCGAGA

AAACCATCTCCAAAGCCAAAGGGCAGCCCCGAGAACCACAGGTGTACACC

CTGCCCCCATCCCGGGAGGAGATGACCAAGAACCAGGTCAGCCTGACCTG

CCTGGTCAAAGGCTTCTATCCCAGCGACATCGCCGTGGAGTGGGAGAGCA

ATGGGCAGCCGGAGAACAACTACAAGACCACGCCTCCCGTGCTGGACTCC

GACGGCTCCTTCTTCCTCTACAGCAAGCTCACCGTGGACAAGAGCAGGTG

GCAGCAGGGGAACGTCTTCTCATGCTCCGTGATGCACGAGGCTCTGCACA

ACCACTACACGCAGAAGAGCCTCTCCCTGTCTCCGGGTAAATAA.

As noted above, the Fc region can comprise one or more mutations such as, for example, L234Y, L235V, L235Q, G236W, S239D, S239M, F243L, T256A, K290A, R292P, N297Q, S298A, Y300L, V305I, A330L, I332E, E333A, K334A, and/or P396L. Thus, specifically disclosed herein are Fc regions comprising a Leucine (L) or Tyrosine (Y) at residue 234, a Leucine (L), Glutamine, or Valine (V) at residue 235, a Glutamine (G) or Tryptophan (W) at residue 236, a Serine (S), Methionine (M), or Aspartate (D) at residue 239, and Phenylalanine (F) or Leucine (L) at residue 243, a threonine (T) or Alanine (A) at residue 256, a Histidine (H) or Aspartate (D) at residue 268, an Aspartate (D) or Glutamate (E) at residue 270, a Lysine (K) or Alanine (A) at residue 290, an Arginine (R) or Proline (P) at residue 292, a Serine (S) or Alanine (A) at residue 298, an Asparagine or Glutamine at residue 297, a Tyrosine (Y) or Leucine (L) at residue 300, a Valine (V) or Isoleucine (I) at residue 305, a Lysine (K) or Aspartate (D) at residue 326, an Alanine (A), Methionine (M), or Leucine (L) at residue 330, and Isoleucine (I) or Glutamate (E) at residue 332, a Glutamate (E) or Alanine (A) at residue 333, a Lysine (K), Glutamate (E), or Alanine (A) at residue 334, and/or a Proline (P) or Leucine (L) at residue 396. It is specifically understood that no substitution or any one or combination two, three, four, five, six, seven, eight, nine, ten, eleven, twelve, thirteen, fourteen, fifteen, sixteen, or seventeen of the substitutions mentioned herein can be present in the Fc region. Accordingly, in one aspect disclosed herein are fusion proteins comprising a substitution of the Fc region at F243L, R292P, Y300L, V305I, and P396L where the sequence of the Na4-Fc comprises MNPNQKITTIGSICLVVGLISLILQI-GNIISIWISHSIQTGSQNHTGICNQNIITYKNSTWVKD TTSVILTGNSSLCPIRGWAIYSKDNSIRIGSKGDVF-VIREPFISCSHLECRTFFLTDKTHT CPPCPAPELLGGP-SVFLLPPKPKDTLMISRTPEVTCVVVDVSHEDPE-VKFNWYVDGVE VHNAKTKPPEEQYNSTLRVVSI-LTVLHQDWLNGKEYKCKVSNKALPAPIEKTISKA-KGQ PREPQVYTLPPSREEMTKNQVSLTCLVKGFYPS-DIAVEWESNGQPENNYKTTPLVLDS DGSFFLYSK-LTVDKSRWQQGNVFSCSVMHEALHNHYTQKSLSL-SPGK (SEQ ID NO: 20); which comprises an Fc domain with the sequence GGPSVFLLPPKPKDTLMISRTPE-VTCVVVDVSHEDPEVKFNVVYVDGVEVHNA-KTKPPE EQYNSTLRVVSILTVLHQDWLNGKEYKC-KVSNKALPAPIEKTISKAKGQPREPQVYTLP PSRE-EMTKNQVSLTCLVKGFYPSDIAVEWESNGQPEN-NYKTTPLVLDSDGSFFLYSKL TVDKSRWQQGN-VFSCSVMHEALHNHYTQKSLSLSPGK (SEQ ID NO: 25) which comprises a CH2 domain with the sequence GGPSVFLLPPKPKDTLMISRTPEVTCVVVDVSHEDPE-VKFNWYVDGVEVHNAKTKPPE EQYNSTLRWSIL-TVLHQDWLNGKEYKCKVSNKALPAPIEKTISKAK (SEQ ID NO: 26) and a CH3 domain with the sequence (SEQ ID NO: 27)
GQPREPQVYTLPPSREEMTKNQVSLTCLVKGFYPSDIAVEWESNGQPENN

YKTTPLVLDSDGSFFLYSKLTVDKSRWQQGNVFSCSVMHEALHNHYTQKS

LSLSPGK.

In one aspect, the Na4-Fc fusion comprises S239D, 1332E, and A330L substitutions having an Fc domain with the sequence GGPDVFLFPPKPKDTLMISRTPE-VTCVVVDVSHEDPEVKFNVVYVDGVEVHNAKTKPR EEQYNSTYRVVSVLTVLHQDWLNGKEYKCKVSNK-ALPLPEEKTISKAKGQPREPQVYT LPPSREEMT-KNQVSLTCLVKGFYPSDIAVEWESNGQPENNYKTT-PPVLDSDGSFFLYS KLTVDKSRWQQGNVFSCSVMH-EALHNHYTQKSLSLSPG (SEQ ID NO: 21) which comprises a CH2 domain with the sequence GGPDVFLFPPKPKDTLMISRTPEVTCVVVDVSHE-DPEVKFNVVYVDGVEVHNAKTKPR EEQYNSTYRV-VSVLTVLHQDWLNGKEYKCKVSNKALPLPEE-KTISKAK (SEQ ID NO: 22) and a CH2 domain with the sequence GQPREPQVYTLPPSREEMTKNQVSLT-CLVKGFYPSDIAVEWESNGQPENNYKTTPPV LDSDGSFFLYSKLTVDKSRWQQGNVFSCSVMHE-ALHNHYTQKSLSLSPG (SEQ ID NO: 24) and a complete sequence of (SEQ ID NO: 23)
MNPNQKITTIGSICLVVGLISLILQIGNIISIWISHSIQTGSQNHTGICN

QNIITYKNSTWVKDTTSVILTGNSSLCPIRGWAIYSKDNSIRIGSKGDVF

VIREPFISCSHLECRTFFLTDKTHTCPPCPAPELLGGPDVFLFPPKPKDT

LMISRTPEVTCVVVDVSHEDPEVKFNWYVDGVEVHNAKTKPREEQYNSTY

RVVSVLTVLHQDWLNGKEYKCKVSNKALPLPEEKTISKAKGQPREPQVYT

LPPSREEMTKNQVSLTCLVKGFYPSDIAVEWESNGQPENNYKTTPPVLDS

DGSFFLYSKLTVDKSRWQQGNVFSCSVMHEALHNHYTQKSLSLSPGK.

In one aspect, the Na4-Fc fusion protein can comprise 2 Fc domains linked via a hinge region. For example, the Na-Fc fusion can comprise the sequence (SEQ ID NO: 28)
MNPNQKITTIGSICLVVGLISLILQIGNIISIWISHSIQTGSQNHTGICN

QNIITYKNSTWVKDTTSVILTGNSSLCPIRGWAIYSKDNSIRIGSKGDVF

VIREPFISCSHLECRTFFLTDKTHTCPPCPAPELLGGPSVFLFPPKPKDT

LMISRTPEVTCVVVDVSHEDPEVKFNWYVDGVEVHNAKTKPREEQYNSTY

RVVSVLTVLHQDWLNGKEYKCKVSNKALPAPIEKTISKAKGQPREPQVYT

LPPSREEMTKNQVSLTCLVKGFYPSDIAVEWESNGQPENNYKTTPPVLDS

DGSFFLYSKLTVDKSRWQQGNVFSCSVMHEALHNHYTQKSLSLSPGKGGP

SVFLFPPKPKDTLMISRTPEVTCVVVDVSHEDPEVKFNWYVDGVEVHNAK

TKPREEQYNSTYRVVSVLTVLHQDWLNGKEYKCKVSNKALPAPIEKTISK

AKGQPREPQVYTLPPSREEMTKNQVSLTCLVKGFYPSDIAVEWESNGQPE

NNYKTTPPVLDSDGSFFLYSKLTVDKSRWQQGNVFSCSVMHEALHNHYTQ

KSLSLSPGK.

In another aspect, the Fc domains can be assymetric vartiants, for example, one heavy chain Fc domain can comprise L234Y/L235Q/G236W/S239M/H268D/D270E/S298A while the other Fc domain comprises D270E/K326D/A330M/K334E.

In general, any amino acid substitution is conservative, i.e., limited to exchanges within members of group 1: glycine, alanine, valine, leucine, and Isoleucine; group 2: serine, cysteine, threonine, and methionine; group 3: proline; group 4: phenylalanine, tyrosine, and tryptophan; and group 5: aspartate, glutamate, asparagine, and glutamine.

The present disclosure also contemplates a nucleic acid encoding any fusion protein as disclosed herein such as, for example, SEQ ID NO: 19 encodes the Na-Fc fusion as set forth in SEQ ID NO: 18; SEQ ID NO: 29 encodes the NA-Fc fusion as set forth in SEQ ID NO: 20; SEQ ID NO: 30 encodes the NA-Fc fusion as set forth in SEQ ID NO: 23; and SEQ ID NO: 31 encodes the NA-2xFc fusion as set forth in SEQ ID NO: 28. Additionally contemplated herein are vectors comprising such a nucleic acid of claim, and a cell comprising such a vector. Vectors and cells containing such vectors can be prepared using methods known in the art.

(II) Engineered Feeder Cells, Engineered Plasma Membrane Particles and Engineered Exosomes Comprising Membrane Bound Fc Compositions according to the disclosure include compositions comprising Fc-bound feeder cells (FCs), compositions comprising Fc-bound engineered plasma membrane (PM) particles, and compositions comprising Fc-bound engineered exosomes. Fc-bound engineered PM particles include PM nanoparticles derived from Fc-bound feeder cells. Fc bound engineered exosomes included exosomes or other extracellular vesicles derived from Fc-bound feeder cells, as also described in further detail below. Alternatively, exosomes may be derived from other sources such as platelets and megakaryocytes.

As used herein, the term "Fc-bound" shall be understood as referring to the coupling of an Fc domain in an inverted orientation (i.e., the amino terminal end facing intracellularly) to the external surface of a feeder cell or engineered particle via a transmembrane peptide. This can be achieved using the Fc fusion peptides disclosed herein. Thus, one aspect of the present disclosure provides a feeder cell composition comprising at least one Fc-bound feeder cell, i.e., a feeder cell comprising an Fc domain bound to an external surface of the feeder cell, as described in further detail below. For example, a feeder cell can be genetically modified to express an Fc domain bound to an external surface of the feeder cell, i.e., to express an Fc fusion peptide as described further below. Another aspect of the disclosure provides an NK cell expanding composition free of feeder cells, comprising at least one Fc-bound engineered particle, i.e., an engineered particle comprising an Fc domain bound in inverted orientation to an external surface of the feeder cell. In some aspect, the feeder cells can be engineered to express a ligand that can be tagged with a humanized antibody (such as, for example CD20).

In a feeder cell composition, the at least one Fc-bound feeder cell optionally comprises at least one cell NK cell effector agent. In one example, an Fc-bound feeder cell comprises one cell NK cell effector which is IL-15 or IL-21. Fc-bound feeder cells can comprise at least two or more different NK cell effector agents.

In an NK cell expanding composition free of feeder cells, Fc-bound engineered PM particles optionally comprise at least one cell NK cell effector agent. In one example, an Fc-bound engineered particle comprises one cell NK cell effector which is IL-15 or IL-21. Fc-bound engineered PM particles can comprise at least two or more different NK cell effector agents.

In either a feeder cell composition, or a composition free of feeder cells, in which at least two NK cell effector agents are present, the second NK cell effector agent can for example be 41BBL. In either a feeder cell composition, or an NK cell expanding composition free of feeder cells, in which the feeder cells or engineered PM particles comprise one or more NK cell effector agents, NK cell effector agents can be selected from 41BBL, IL-15, IL-2, IL-12, IL-18, IL-21, MICA, UBLP, 2sB4, LFA-1, a Notch ligand, ligands for NKp46, or BCM1/SLAMF2, TLR ligands, and NKG2D ligands, or a cytokine. In an exemplary such composition, at least one additional NK cell effector agent is IL-15 or IL-21.

(a) Fc-Bound Feeder Cells

The present disclosure provides feeder cells comprising an Fc fusion peptide as detailed above. NK cell feeder cells for use in the methods disclosed herein, and for use in making the PM particles and exosomes disclosed herein, can be either irradiated autologous or allogeneic peripheral blood mononuclear cells (PBMCs) or nonirradiated autologous or allogeneic PBMCs, RPMI8866, HFWT, 721.221 or K562 cells as well as EBV-LCLs, other non-HLA or low-HLA expressing cell lines or patient derived primary tumors which can be used as a tumor vaccine. Fc-bound feeder cells can be prepared by transfecting or transducing feeder cells with any Fc fusion peptide as described herein, using standard transduction or transfection techniques well known in the art. For example, cDNA vectors for Fc fusion peptides disclosed herein can be ligated into an expression plasmid, which allows expression in bacterial (*E. coli*), insect, or mammalian cells. The cDNA vector can be FLAG- or HIS-tagged. Suitable transfection methods include nucleofection (or electroporation), calcium phosphate-mediated transfection, cationic polymer transfection (e.g., DEAE-dextran or polyethylenimine), viral transduction, virosome transfection, virion transfection, liposome transfection, cationic liposome transfection, immunoliposome transfection, nonliposomal lipid transfection, dendrimer transfection, heat shock transfection, magnetofection, lipofection, gene gun delivery, impalefection, sonoporation, optical transfection, and proprietary agent-enhanced uptake of nucleic acids. Transfection methods are well known in the art (see, e.g., "Current Protocols in Molecular Biology" Ausubel et al., John Wiley & Sons, New York, 2003 or "Molecular Cloning: A Laboratory Manual" Sambrook & Russell, Cold Spring Harbor Press, Cold Spring Harbor, NY, 3rd edition, 2001). Alternatively, molecules can be introduced into a cell by microinjection. For example, molecules can be injected into the cytoplasm or nuclei of the cells of interest. The amount of each molecule introduced into the cell can vary, but those skilled in the art are familiar with means for determining the appropriate amount.

It will be understood that various molecules can be introduced into a cell simultaneously or sequentially. For example, an Fc fusion peptide and one or more membrane bound NK cell effector agents can be introduced to a feeder cell at the same time. Alternatively, one can be introduced first and then the other molecule(s) can later be introduced into the cell. For example, feeder cells once having been transfected or transduced with an Fc fusion peptide can be further transfected with membrane bound NK cell effector agents such as IL-15 and/or IL-21 and/or 41BBL and/or infected as an EBV-LCL and/or other NK cell effector agent(s). Alternatively, feeder cells can be simultaneously transfected or transduced with an Fc fusion peptide and membrane bound NK cell effector agents such as IL-15 and/or IL-21 and/or 41BBL and/or EBV-LCL and/or other NK cell effector agent(s). Alternatively, feeder cells previously transfected or transduced and expressing membrane bound NK cell effector agents such as IL-15 and/or IL-21 and/or 41BBL and/or infected as an EBV-LCL and/or other NK cell effector agent(s), can be transfected or transduced with an Fc fusion peptide. It will be also appreciated that other means such as chemical conjugation methods known in the art can be used to achieve a membrane bound Fc.

In general, the cell is maintained under conditions appropriate for cell growth and/or maintenance. Suitable cell culture conditions are well known in the art and are described, for example, in Santiago et al., Proc. Natl. Acad. Sci. USA, 2008, 105:5809-5814; Moehle et al. Proc. Natl. Acad. Sci. USA, 2007, 104:3055-3060; Urnov et al., Nature, 2005, 435:646-651; and Lombardo et al., Nat. Biotechnol., 2007, 25:1298-1306. Those of skill in the art appreciate that methods for culturing cells are known in the art and can and will vary depending on the cell type. Routine optimization may be used, in all cases, to determine the best techniques for a particular cell type.

Fc-bound feeder cells can be used in cell culture to stimulate NK cells directly, or can be used to prepare PM particles or exosomes derived from the feeder cells.

(b) Fc-Bound PM Particles

Fc-bound engineered PM particles include Fc-bound PM particles, which can be prepared from Fc-bound NK cell feeder cells using well known methods. PM particles are vesicles made from the plasma membrane of a cell or artificially made (i.e., liposomes). A PM particle can contain a lipid bilayer or simply a single layer of lipids. A PM particle can be prepared in single lamellar, multi-lamellar, or inverted form. PM particles can be prepared from Fc-bound feeder cells as described herein, using known plasma membrane preparation protocols or protocols for preparing liposomes such as those described in U.S. Pat. No. 9,623,082, the entire disclosure of which is herein incorporated by reference. In certain aspects, PM particles as disclosed herein range in average diameter from about 170 to about 300 nm.

(c) Fc-Bound Exosomes

Fc-bound exosomes as disclosed herein can be prepared from exosome-secreting cells, which can be prepared from Fc-bound NK cell feeder cells using well known methods, wherein the exosome is an extracellular product of exosome-secreting cells, as described in United States Pat. App. Pub. No. 20170333479, the entire disclosure of which is herein incorporated by reference. Exosomes comprise lipids and proteins and the identity of the proteins found in a particular exosome is dependent on the cell(s) that produced them. Exosomes disclosed herein comprise an Fc fusion peptide as disclosed herein (i.e., are Fc-bound), and optionally one or more stimulatory peptides (NK cell effector agents) present in the exosome membrane. Exosomes can be produced for example from cell lines engineered for improved formation or release of exosomes. Such cell lines include, but are not limited to, Fc-bound cell lines as described above in Section II(a). Non-limiting cell lines are Fc-bound K562-mb15-41BBL and Fc-bound K562. In certain aspects, exosomes as disclosed herein range in average diameter from about 30 to about 100 nm, or to about 160 nm. In one aspect, exosomes average about 60-80 nm in diameter. The ability with exosomes to achieve particle sizes smaller than readily achieved with PM particles means that exosomes can be more readily adapted to uses where a smaller size is preferable. For example, exosomes may be preferred in applications requiring diffusion through physiological barriers, enhanced biodistribution through tissue compartments, or intravenous injections.

(III) Compositions

The present disclosure provides various NK cell expanding compositions comprising Fc-bound feeder cells as disclosed above, and in other aspects NK cell expanding compositions free of feeder cells, comprising one or more engineered Fc-bound particles such as PM particles or exosomes as disclosed above. Any of the Fc-bound feeder cells or Fc-bound engineered PM particles used in the compositions optionally further comprise at least one, two, or more different NK cell effector agents. In one aspect, one NK cell effector agent is IL-21, and in some aspects, one NK cell effector agent is IL-21 and a second is 41BBL. The Fc-bound feeder cells or Fc-bound engineered PM particles optionally comprise one or more additional NK cell effector agents as disclosed above.

An NK cell expanding composition that comprises a PM particle comprising a plasma membrane, may further comprise a plurality of microparticles/nanoparticles, wherein the plasma membrane coats the plurality of microparticles and/or nanoparticles. Microparticles/nanoparticles can comprise magnetic microparticles, silica beads, polystyrene beads, latex beads, a particulate contrast agent, a particulate cancer therapeutic agent, or any combination thereof.

The present disclosure also contemplates an NK cell expanding infusion formulation comprising any of the NK cell expanding compositions disclosed herein, combined with a pharmaceutically acceptable carrier.

Therapeutic, pharmaceutical compositions can be prepared by combining the Fc-bound feeder cells or engineered PM particles with a pharmaceutically acceptable carrier as known in the art, as described for example in Remington: The Science and Practice of Pharmacy (19th ed.) ed. A. R. Gennaro, Mack Publishing Company, Easton, Pa. 1995. Examples of pharmaceutically-acceptable carriers include, but are not limited to: sterile water, saline, Ringer's solution, dextrose solution, and buffered solutions at physiological pH. For example, the pH of the solution is preferably from about 5 to about 8, and more preferably from about 7 to about 7.5.

Pharmaceutical compositions can include carriers, thickeners, diluents, buffers, preservatives, surface active agents and the like in addition to the molecule of choice. Pharmaceutical compositions can also include one or more active ingredients such as antimicrobial agents, anti-inflammatory agents, anesthetics, and the like.

It will be apparent to those persons skilled in the art that certain carriers can be more preferable depending upon, for instance, the route of administration and concentration of composition being administered. The pharmaceutical composition can be suitably prepared for administration via any of a number of known routes of administration to mammals, especially humans, depending on whether local or systemic treatment is desired, and on the area to be treated. Administration can be topical (including ophthalmic, vaginal, rectal, intranasal), oral, by inhalation, or parenteral, for example by intravenous drip or injection, or subcutaneous, intraperitoneal, intramuscular, intracavity, or transdermal injection.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives can also be present such as, for example, antimicrobials, anti-oxidants, chelating agents, and inert gases and the like.

Formulations for topical administration can include ointments, lotions, creams, gels, drops, suppositories, sprays, liquids and powders. Conventional pharmaceutical carriers, aqueous, powder or oily bases, thickeners and the like can be necessary or desirable.

Compositions for oral administration include powders or granules, suspensions or solutions in water or non-aqueous media, capsules, sachets, or tablets. Thickeners, flavorings, diluents, emulsifiers, dispersing aids or binders can be desirable.

Some of the compositions can potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

An NK cell expanding infusion formulation can thus be formulated for formulated for parenteral infusion, arterial infusion, venous infusion, artificial catheter mediated infusion, intravenous, intraperitoneal, subcutaneous injection, oral or topical delivery.

In one aspect, the present disclosure contemplates any NK cell expanding composition prepared in vitro or ex vivo as disclosed herein, administered to or infused into a subject in need of NK cell expansion. It is understood and herein contemplated that infusion can occur in vitro with a commercial source of NK cells or ex vivo from a donor source (such as, for example an allogeneic donor or autologous donor source (i.e., the recipient subject receiving the expanded NK cells).

In another aspect, the present disclosure contemplates an NK cell composition comprising an in vitro NK cell population in contact with an Fc-bound feeder cell composition as disclosed herein, or a feeder cell free, Fc-bound NK cell expanding composition as disclosed herein.

In another aspect, the present disclosure contemplates sources of sources of NK cells that include, but are not limited to, peripheral blood, iPSC derived NK cells, ESC derived NK cells, NK cells having polymorphism of high affinity Fc receptor Phe or Val at 158, and gene modified NK cells.

In another aspect, the present disclosure contemplates an expanded population of NK cells exposed in vitro to an NK cell expanding composition, the composition being free of feeder cells and comprising at least one Fc-bound engineered particle as disclosed herein, comprising at least two NK cell effector agents, wherein one of the at least two NK cell effector agents is IL-21 or IL-15. The expanded population of NK can exhibit increased cytotoxicity compared to non-expanded NK cells. In different aspects, the expanded population of NK can exhibit cytotoxicity of at least about 2×, 5× or 10× that of non-expanded NK cells.

In another aspect, the present disclosure provides a composition comprising a therapeutic dose of NK cells comprising an expanded population of NK cells as disclosed herein, optionally in combination with a pharmaceutically acceptable carrier. The expanded population of NK cells can exhibit higher CD16 and other advantageous properties such as higher cytotoxicity and ADCC functionality. An amount of NK cells that provides a therapeutic dose will vary on a number of factors as appreciated by those of skill in the art, and are discussed for example in U.S. Pat. No. 9,623,082. Factors include age, gender and diagnosis of the subject, and route of administration, which may be but is not limited to oral, buccal, mucosal, and intravenous routes. For example, a therapeutic dose can be between $1\times10^4$/kg to $1\times10^8$/kg per dose, which can be included in a single dose or divided among multiple doses. It will be appreciated that the equivalent of a therapeutic dose as expressed above can be alternatively expressed in an amount per total body surface area.

In another aspect, the present disclosure also provides NK cell expanding media formulations comprising any NK cell expanding composition as disclosed herein, combined with a cell medium solution comprising at least one soluble media component such as a cytokine, IL-2, IL-12, IL-15, IL-18, IL-21, NAM, ascorbate or any combination thereof.

(IV) Methods (a) Methods for Increasing Cytotoxicity of NK Cells

Figure 4:
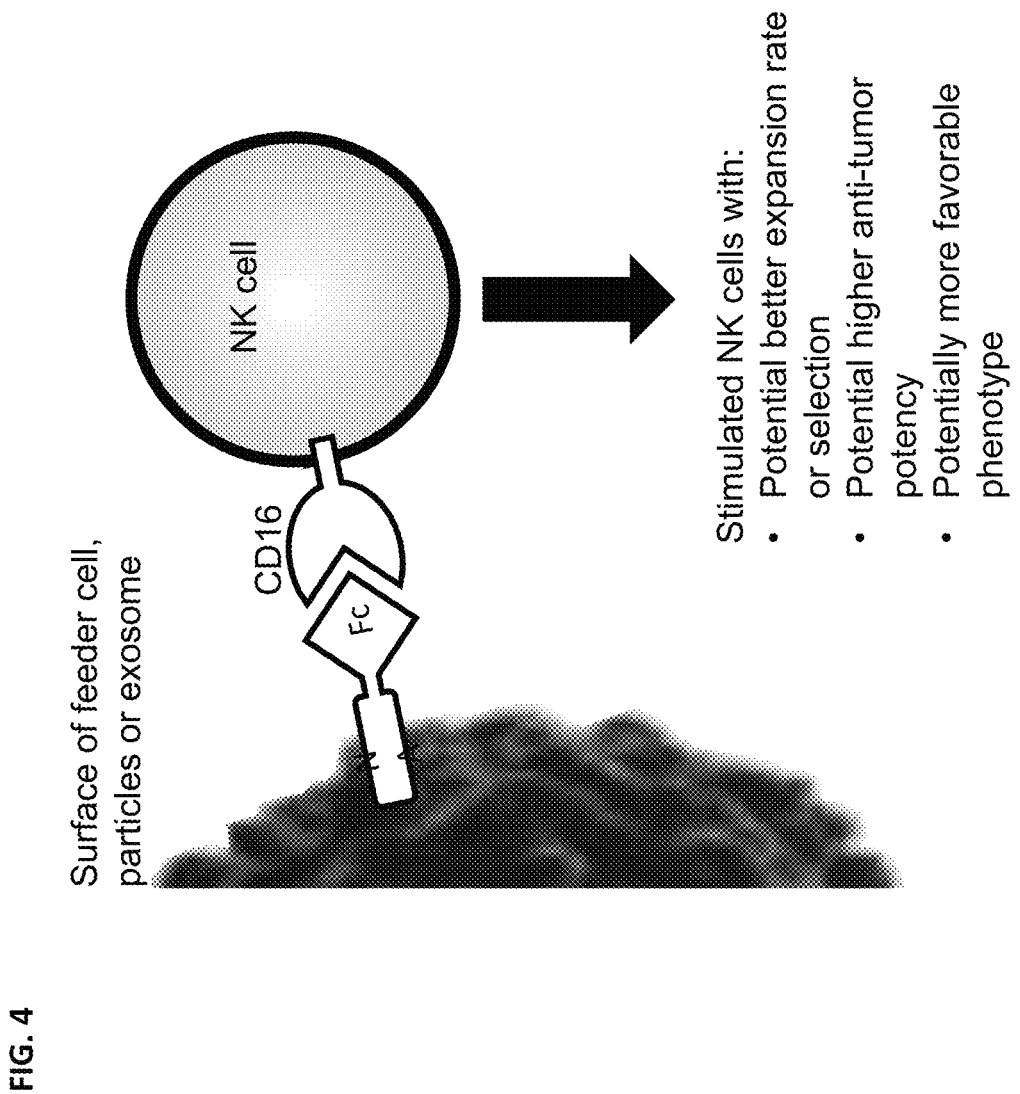
FIG. 4 is a schematic diagram of Fc stimulation of an NK cell.

In one aspect, the present disclosure provides a method for increasing NK cell cytotoxicity, by expanding an initial population of NK cells using an NK cell expanding composition or formulation as disclosed herein. The disclosed methods provide a simple expansion platform which avoids a complicated alternative process for expansion involving for example, coating a solid support with monoclonal antibody, and using soluble cytokine(s) in solution. Instead, in the methods disclosed herein, an initial population of NK cells is obtained from a donor, and exposed to an NK cell expanding composition as disclosed herein. Exposure can be in vitro or in vivo. FIG. 4 is a schematic diagram of Fc stimulation of an NK cell according to the present disclosure. NK cells are contacted with one or more Fc-bound feeder cells, Fc-bound PM particles or Fc-bound exosomes or any combination thereof. The exposed Fc domain binds to CD16 on the surface of the NK cells resulting in stimulation of the NK cells to expand faster and/or more efficiently, and to produce NK cells with higher anti-tumor toxicity and NK cells with a more favorable overall phenotype.

As indicated in FIG. 4, the composition in contact with the NK cells can comprise any of the Fc-bound feeder cells or Fc-bound engineered PM particles or Fc-bound engineered exosome disclosed herein. Engineered PM particles can be Fc-bound PM particles. In one aspect, an optionally present NK cell effector agent is IL-21 or IL-15. An optionally present second NK cell effector agent can be selected from 41BBL, IL-2, IL-12, IL-15, IL-18, IL-21, MICA, UBLP, 2B4, LFA-1, a Notch ligand, ligands for NKp46, or BCM1/SLAMF2, TLR ligands, and NKG2D ligands. In one aspect, a second NK cell effector agent is 41BBL. The composition can further comprise at least one additional (i.e., a third, fourth, fifth, etc.) NK cell effector agent selected from IL-2, IL-12, IL-15, IL-18, IL-21, MICA, UBLP, 2sB4, LFA-1, a Notch ligand, ligands for NKp46, or BCM1/SLAMF2, TLR ligands, and NKG2D ligands. NK Cell expansion performed in this way can achieve much greater than several (about 3-4 fold) in 10 days. Rather, NK cell expansion according to the present methods can achieve at least about 100 fold, about 200 fold, about 300 fold, about 400 fold, about 500 fold, about 600 fold, about 700 fold, about 800 fold, about 900 fold, about 1100 fold, about 1200 fold, about 1300 fold, about 1400 fold, about 1500 fold, about 1600 fold, about 1700 fold, about 1800 fold, about 1900 fold up, to about 2000 fold increase in NK cell numbers in 16 days or greater with longer time. Thus, the disclosed methods are useful for scaled-up manufacturing of NK cells. Sources of NK cells may be from peripheral blood, splenic NK cells, lymphocyte preparations such as buffy coats, iPSC derived NK cells, ESC derived NK cells, and genetically modified/engineered NK cells, or any genetically modified NK cells, including but not limited to NK cells derived from polymorphisms of the Fc receptor, such as a Phe or Val at position 158, such as those known in the art and described for example in Blood (1997) 90:1109-14, and J Clin Invest. (1997) 100:1059-70. Such genetically modified NK cell sources can be engineered using methods known in the art. Alternatively, NK cells can be derived from a cell donor that carries a desired polymorphism and the donated cells used as an initial population of NK cells that are expanded by the methods and using the composition described herein. Thus, in this context "genetically modified" encompasses naturally occurring NK cells carrying a polymorphism. The method may be applied to NK cells from human origin or other animals.

Moreover, the disclosed methods have the added benefit of providing cells with higher cytotoxicity and ADCC functionality. An initial population of NK cells expanded according to the disclosed methods produces an expanded population of NK cells that exhibits at least about 2× the cytotoxicity of the initial population of NK cells, at least about 4× the cytotoxicity of the initial population of NK cells, at least about 5× that of the initial population of NK cells, at least about 8× the cytotoxicity of the initial population of NK cells, or at least about 10× that of the initial population of NK cells. Moreover, NK cells expanded according to the disclosed methods exhibit higher cytotoxicity for a target that would be ADCC competent. Higher expression of ADCC-related proteins such as, in non-limiting example, CD16; or other NK cell ligands such as, in non-limiting example, NKG2D, NKp46, CD62L, can be used to assess relative cytotoxicity of expanded NK cells as compared to non-expanded NK cells or NK cells expanded under other conditions. Markers such as NKG2D, NKp46, etc., are indicators of NK cells in an activated state. In combination the markers can provide a signal of increased cytotoxicity, even when cytotoxicity cannot be assessed directly. For example, an expanded population of NK cells as disclosed herein can exhibit increased killing of tumor targets or secrete higher amounts of anti-tumor cytokines (IFN, TNF) compared with non-expanded NK cells. In another aspect, an expanded population of NK cells as disclosed herein can exhibit increased expression of NKG2D, NKp46 and CD16 compared with non-expanded NK cells. Various means for detecting amounts of a specific protein to assess the activation state of NK cells are known in the art and can be used, including spectrometry methods such as flow cytometry or immunodetection methods such as Western blot, Enzyme-linked immunosorbent assay (ELISA), protein immunoprecipitation; immunoelectrophoresis, or immunostaining.

Additionally, an expanded population of NK cells as disclosed herein can exhibit improved ability to withstand cryopreservation, retaining viability and cytotoxicity and following freeze and thaw.

The composition of NK cells expanded with Fc expressing feeder cells exhibit higher cytotoxicity toward SKOV3 ovarian cancer target cells as shown in FIG. 2 and FIG. 3. The compositions of NK cells expanded with Fc domain expressing feeder cells have enhanced phenotype having increased CD16, NKp46 and CD62L. These NK cells having enhanced phenotype can have enhanced therapeutic efficacy. Increased CD16 can allow increased capacity to engage antibody coated target cells. Increased NKp46 can have greater capacity for binding activating ligands. Increased CD62L, as a L-selectin ligand, can enhance trafficking of NK cells to lymphatic or marrow compartments.

(b) Therapeutic Methods

The compositions and methods disclosed herein can be used in a variety of therapeutic, diagnostic, industrial, and research applications. In some aspects, the present disclosure can be used to treat cancer. Accordingly, in one aspect, disclosed herein are methods of treating, inhibiting, reducing, and/or preventing a cancer, cancer recurrence, or metastasis or an infectious disease such as a viral infection or bacterial infection in a subject comprising administering to the subject in need thereof an effective amount of a composition or an expanded NK cell population as described herein.

A cancer can be selected from, but is not limited to, a hematologic cancer, lymphoma, colorectal cancer, colon cancer, lung cancer, a head and neck cancer, ovarian cancer, prostate cancer, testicular cancer, renal cancer, skin cancer, cervical cancer, pancreatic cancer, and breast cancer. In one aspect, the cancer comprises a solid tumor. In another aspect, the cancer is selected from acute myeloid leukemia, myelodysplastic syndrome, chronic myeloid leukemia, acute lymphoblastic leukemia, myelofibrosis, multiple myeloma. In another aspect, the cancer is selected from a leukemia, a lymphoma, a sarcoma, a carcinoma and may originate in the marrow, brain, lung, breast, pancreas, liver, head and neck, skin, reproductive tract, prostate, colon, liver, kidney, intraperitoneum, bone, joint, eye.

In another aspect, treatment methods include: a method of preventing, inhibiting, reducing, or mitigating cancer relapse or metastasis after stem cell transplant; a method of modulating T cell repertoire after stem cell transplant; a general method for modulating immune repertoire, a method of preventing, inhibiting, reducing, or mitigating acute or chronic graft-vs-host disease; and a method of preventing, inhibiting, reducing, or mitigating viral reactivation, such as reactivation of Herpes Simplex Virus-1 (HSV-1), Herpes Simplex Virus-2 (HSV-2), Cytomegalovirus (CMV), Varicella zoster virus (VZV), Epstein-Barr virus (EBV), adenovirus, adeno-associated virus, parvovirus, JC virus, and/or BK virus; wherein each method comprises administering to a subject in need thereof an effective amount of a composition or an expanded NK cell population as described herein.

Any of the disclosed treatment methods may further comprise administering to the subject (concurrently, simultaneously, or as a singular formulation) an additional therapeutic agent or regimen in combination with the effective amount of a composition or an expanded NK cell population as described herein. An additional therapeutic agent can be a drug-based preparative regimen such as Cy-Flu, Bu-Flu, Flu-Mel or similar with adjustments in dosage or dosing. Alternatively, the additional therapeutic agent can be a Graft-versus-host (GvHD) prophylactic agent such as but not limited to cyclophosphamide. Alternatively, the additional therapeutic agents or regimens can be selected from chemotherapy agents and regimens such as, in non-limiting example, those known by the acronyms CHOP, FLAG (including FLAG-Ida or FLAG-IDA or IDA-FLAG or Ida-FLAG; and FLAG-Mito or FLAG-MITO or Mito-FLAG or MITO-FLAG or FLANG), IA or IAC, or 7+3. For example, it is intended herein that the disclosed methods of inhibiting, reducing, and/or preventing cancer metastasis and/or recurrence can comprise the administration of any anti-cancer agent known in the art including, but not limited to Abemaciclib, Abiraterone Acetate, Abitrexate (Methotrexate), Abraxane (Paclitaxel Albumin-stabilized Nanoparticle Formulation), ABVD, ABVE, ABVE-PC, AC, AC-T, Adcetris (Brentuximab Vedotin), ADE, Ado-Trastuzumab Emtansine, Adriamycin (Doxorubicin Hydrochloride), Afatinib Dimaleate, Afinitor (Everolimus), Akynzeo (Netupitant and Palonosetron Hydrochloride), Aldara (Imiquimod), Aldesleukin, Alecensa (Alectinib), Alectinib, Alemtuzumab, Alimta (Pemetrexed Disodium), Aliqopa (Copanlisib Hydrochloride), Alkeran for Injection (Melphalan Hydrochloride), Alkeran Tablets (Melphalan), Aloxi (Palonosetron Hydrochloride), Alunbrig (Brigatinib), Ambochlorin (Chlorambucil), Amboclorin Chlorambucil), Amifostine, Aminolevulinic Acid, Anastrozole, Aprepitant, Aredia (Pamidronate Disodium), Arimidex (Anastrozole), Aromasin (Exemestane), Arranon (Nelarabine), Arsenic Trioxide, Arzerra (Ofatumumab), Asparaginase *Erwinia chrysanthemi*, Atezolizumab, Avastin (Bevacizumab), Avelumab, Axitinib, Azacitidine, Bavencio (Avelumab), BEACOPP, Becenum (Carmustine), Beleodaq (Belinostat), Belinostat, Bendamustine Hydrochloride, BEP, Besponsa (Inotuzumab Ozogamicin), Bevacizumab, Bexarotene, Bexxar (Tositumomab and Iodine I 131 Tositumomab), Bicalutamide, BiCNU (Carmustine), Bleomycin, Blinatumomab, Blincyto (Blinatumomab), Bortezomib, Bosulif (Bosutinib), Bosutinib, Brentuximab Vedotin, Brigatinib, BuMel, Busulfan, Busulfex (Busulfan), Cabazitaxel, Cabometyx (Cabozantinib-S-Malate), Cabozantinib-S-Malate, CAF, Campath (Alemtuzumab), Camptosar, (Irinotecan Hydrochloride), Capecitabine, CAPDX, Carac (Fluorouracil—Topical), Carboplatin, CARBOPLATIN-TAXOL, Carfilzomib, Carmubris (Carmustine), Carmustine, Carmustine Implant, Casodex (Bicalutamide), CEM, Ceritinib, Cerubidine (Daunorubicin Hydrochloride), Cervarix (Recombinant HPV Bivalent Vaccine), Cetuximab, CEV, Chlorambucil, CHLORAMBUCIL-PREDNISONE, CHOP, Cisplatin, Cladribine, Clafen (Cyclophosphamide), Clofarabine, Clofarex (Clofarabine), Clolar (Clofarabine), CMF, Cobimetinib, Cometriq (Cabozantinib-S-Malate), Copanlisib Hydrochloride, COPDAC, COPP, COPP-ABV, Cosmegen (Dactinomycin), Cotellic (Cobimetinib), Crizotinib, CVP, Cyclophosphamide, Cyfos (Ifosfamide), Cyramza (Ramucirumab), Cytarabine, Cytarabine Liposome, Cytosar-U (Cytarabine), Cytoxan (Cyclophosphamide), Dabrafenib, Dacarbazine, Dacogen (Decitabine), Dactinomycin, Daratumumab, Darzalex (Daratumumab), Dasatinib, Daunorubicin Hydrochloride, Daunorubicin Hydrochloride and Cytarabine Liposome, Decitabine, Defibrotide Sodium, Defitelio (Defibrotide Sodium), Degarelix, Denileukin Diftitox, Denosumab, DepoCyt (Cytarabine Liposome), Dexamethasone, Dexrazoxane Hydrochloride, Dinutuximab, Docetaxel, Doxil (Doxorubicin Hydrochloride Liposome), Doxorubicin Hydrochloride, Doxorubicin Hydrochloride Liposome, Dox-SL (Doxorubicin Hydrochloride Liposome), DTIC-Dome (Dacarbazine), Durvalumab, Efudex (Fluorouracil—Topical), Elitek (Rasburicase), Ellence (Epirubicin Hydrochloride), Elotuzumab, Eloxatin (Oxaliplatin), Eltrombopag Olamine, Emend (Aprepitant), Empliciti (Elotuzumab), Enasidenib Mesylate, Enzalutamide, Epirubicin Hydrochloride, EPOCH, Erbitux (Cetuximab), Eribulin Mesylate, Erivedge (Vismodegib), Erlotinib Hydrochloride, Erwinaze (Asparaginase *Erwinia chrysanthemi*), Ethyol (Amifostine), Etopophos (Etoposide Phosphate), Etoposide, Etoposide Phosphate, Evacet (Doxorubicin Hydrochloride Liposome), Everolimus, Evista, (Raloxifene Hydrochloride), Evomela (Melphalan Hydrochloride), Exemestane, 5-FU (Fluorouracil Injection), 5-FU (Fluorouracil—Topical), Fareston (Toremifene), Farydak (Panobinostat), Faslodex (Fulvestrant), FEC, Femara (Letrozole), Filgrastim, Fludara (Fludarabine Phosphate), Fludarabine Phosphate, Fluoroplex (Fluorouracil—Topical), Fluorouracil Injection, Fluorouracil—Topical, Flutamide, Folex (Methotrexate), Folex PFS (Methotrexate), FOLFIRI, FOLFIRI-BEVACIZUMAB, FOLFIRI-CETUXIMAB, FOLFIRINOX, FOLFOX, Folotyn (Pralatrexate), FU-LV, Fulvestrant, Gardasil (Recombinant HPV Quadrivalent Vaccine), Gardasil 9 (Recombinant HPV Nonavalent Vaccine), Gazyva (Obinutuzumab), Gefitinib, Gemcitabine Hydrochloride, GEMCITABINE-CISPLATIN, GEMCITABINE-OXALIPLATIN, Gemtuzumab Ozogamicin, Gemzar (Gemcitabine Hydrochloride), Gilotrif (Afatinib Dimaleate), Gleevec (Imatinib Mesylate), Gliadel (Carmustine Implant), Gliadel wafer (Carmustine Implant), Glucarpidase, Goserelin Acetate, Halaven (Eribulin Mesylate), Hemangeol (Propranolol Hydrochloride), Herceptin (Trastuzumab), HPV Bivalent Vaccine, Recombinant, HPV Nonavalent Vaccine, Recombinant, HPV Quadrivalent Vaccine, Recombinant, Hycamtin (Topotecan Hydrochloride), Hydrea (Hydroxyurea), Hydroxyurea, Hyper-CVAD, Ibrance (Palbociclib), Ibritumomab Tiuxetan, Ibrutinib, ICE, Iclusig (Ponatinib Hydrochloride), Idamycin (Idarubicin Hydrochloride), Idarubicin Hydrochloride, Idelalisib, Idhifa (Enasidenib Mesylate), Ifex (Ifosfamide), Ifosfamide, Ifosfamidum (Ifosfamide), IL-2 (Aldesleukin), Imatinib Mesylate, Imbruvica (Ibrutinib), Imfinzi (Durvalumab), Imiquimod, Imlygic (Talimogene Laherparepvec), Inlyta (Axitinib), Inotuzumab Ozogamicin, Interferon Alfa-2b, Recombinant, Interleukin-2 (Aldesleukin), Intron A (Recombinant Interferon Alfa-2b), Iodine 1131 Tositumomab and Tositumomab, Ipilimumab, Iressa (Gefitinib), Irinotecan Hydrochloride, Irinotecan Hydrochloride Liposome, Istodax (Rom idepsin), Ixabepilone, Ixazomib Citrate, Ixempra (Ixabepilone), Jakafi (Ruxolitinib Phosphate), JEB, Jevtana (Cabazitaxel), Kadcyla (Ado-Trastuzumab Emtansine), Keoxifene (Raloxifene Hydrochloride), Kepivance (Palifermin), Keytruda (Pembrolizumab), Kisqali (Ribociclib), Kymriah (Tisagenlecleucel), Kyprolis (Carfilzomib), Lanreotide Acetate, Lapatinib Ditosylate, Lartruvo (Olaratumab), Lenalidomide, Lenvatinib Mesylate, Lenvima (Lenvatinib Mesylate), Letrozole, Leucovorin Calcium, Leukeran (Chlorambucil), Leuprolide Acetate, Leustatin (Cladribine), Levulan (Aminolevulinic Acid), Linfolizin (Chlorambucil), LipoDox (Doxorubicin Hydrochloride Liposome), Lomustine, Lonsurf (Trifluridine and Tipiracil Hydrochloride), Lupron (Leuprolide Acetate), Lupron Depot (Leuprolide Acetate), Lupron Depot-Ped (Leuprolide Acetate), Lynparza (Olaparib), Marqibo (Vincristine Sulfate Liposome), Matulane (Procarbazine Hydrochloride), Mechlorethamine Hydrochloride, Megestrol Acetate, Mekinist (Trametinib), Melphalan, Melphalan Hydrochloride, Mercaptopurine, Mesna, Mesnex (Mesna), Methazolastone (Temozolomide), Methotrexate, Methotrexate LPF (Methotrexate), Methylnaltrexone Bromide, Mexate (Methotrexate), Mexate-AQ (Methotrexate), Midostaurin, Mitomycin C, Mitoxantrone Hydrochloride, Mitozytrex (Mitomycin C), MOPP, Mozobil (Plerixafor), Mustargen (Mechlorethamine Hydrochloride), Mutamycin (Mitomycin C), Myleran (Busulfan), Mylosar (Azacitidine), Mylotarg (Gemtuzumab Ozogamicin), Nanoparticle Paclitaxel (Paclitaxel Albumin-stabilized Nanoparticle Formulation), Navelbine (Vinorelbine Tartrate), Necitumumab, Nelarabine, Neosar (Cyclophosphamide), Neratinib Maleate, Nerlynx (Neratinib Maleate), Netupitant and Palonosetron Hydrochloride, Neulasta (Pegfilgrastim), Neupogen (Filgrastim), Nexavar (Sorafenib Tosylate), Nilandron (Nilutamide), Nilotinib, Nilutamide, Ninlaro (Ixazomib Citrate), Niraparib Tosylate Monohydrate, Nivolumab, Nolvadex (Tamoxifen Citrate), Nplate (Romiplostim), Obinutuzumab, Odomzo (Sonidegib), OEPA, Ofatumumab, OFF, Olaparib, Olaratumab, Omacetaxine Mepesuccinate, Oncaspar (Pegaspargase), Ondansetron Hydrochloride, Onivyde (Irinotecan Hydrochloride Liposome), Ontak (Denileukin Diftitox), Opdivo (Nivolumab), OPPA, Osimertinib, Oxaliplatin, Paclitaxel, Paclitaxel Albumin-stabilized Nanoparticle Formulation, PAD, Palbociclib, Paliferm in, Palonosetron Hydrochloride, Palonosetron Hydrochloride and Netupitant, Pamidronate Disodium, Panitumumab, Panobinostat, Paraplat (Carboplatin), Paraplatin (Carboplatin), Pazopanib Hydrochloride, PCV, PEB, Pegaspargase, Pegfilgrastim, Peginterferon Alfa-2b, PEG-Intron (Peginterferon Alfa-2b), Pembrolizumab, Pemetrexed Disodium, Perjeta (Pertuzumab), Pertuzumab, Platinol (Cisplatin), Platinol-AQ (Cisplatin), Plerixafor, Pomalidomide, Pomalyst (Pomalidomide), Ponatinib Hydrochloride, Portrazza (Necitumumab), Pralatrexate, Prednisone, Procarbazine Hydrochloride, Proleukin (Aldesleukin), Prolia (Denosumab), Promacta (Eltrombopag Olamine), Propranolol Hydrochloride, Provenge (Sipuleucel-T), Purinethol (Mercaptopurine), Purixan (Mercaptopurine), Radium 223 Dichloride, Raloxifene Hydrochloride, Ramucirumab, Rasburicase, R-CHOP, R-CVP, Recombinant Human Papillomavirus (HPV) Bivalent Vaccine, Recombinant Human Papillomavirus (HPV) Nonavalent Vaccine, Recombinant Human Papillomavirus (HPV) Quadrivalent Vaccine, Recombinant Interferon Alfa-2b, Regorafenib, Relistor (Methylnaltrexone Bromide), R-EPOCH, Revlimid (Lenalidomide), Rheumatrex (Methotrexate), Ribociclib, R-ICE, Rituxan (Rituximab), Rituxan Hycela (Rituximab and Hyaluronidase Human), Rituximab, Rituximab and, Hyaluronidase Human, Rolapitant Hydrochloride, Romidepsin, Rom iplostim, Rubidomycin (Daunorubicin Hydrochloride), Rubraca (Rucaparib Camsylate), Rucaparib Camsylate, Ruxolitinib Phosphate, Rydapt (Midostaurin), Sclerosol Intrapleural Aerosol (Talc), Siltuximab, Sipuleucel-T, Somatuline Depot (Lanreotide Acetate), Sonidegib, Sorafenib Tosylate, Sprycel (Dasatinib), STANFORD V, Sterile Talc Powder (Talc), Steritalc (Talc), Stivarga (Regorafenib), Sunitinib Malate, Sutent (Sunitinib Malate), Sylatron (Peginterferon Alfa-2b), Sylvant (Siltuximab), Synribo (Omacetaxine Mepesuccinate), Tabloid (Thioguanine), TAC, Tafinlar (Dabrafenib), Tagrisso (Osimertinib), Talc, Talimogene Laherparepvec, Tamoxifen Citrate, Tarabine PFS (Cytarabine), Tarceva (Erlotinib Hydrochloride), Targretin (Bexarotene), Tasigna (Nilotinib), Taxol (Paclitaxel), Taxotere (Docetaxel), Tecentriq, (Atezolizumab), Temodar (Temozolomide), Temozolomide, Temsirolimus, Thalidomide, Thalomid (Thalidomide), Thioguanine, Thiotepa, Tisagenlecleucel, Tolak (Fluorouracil—Topical), Topotecan Hydrochloride, Toremifene, Torisel (Temsirolimus), Tositumomab and Iodine I 131 Tositumomab, Totect (Dexrazoxane Hydrochloride), TPF, Trabectedin, Trametinib, Trastuzumab, Treanda (Bendamustine Hydrochloride), Trifluridine and Tipiracil Hydrochloride, Trisenox (Arsenic Trioxide), Tykerb (Lapatinib Ditosylate), Unituxin (Dinutuximab), Uridine Triacetate, VAC, Vandetanib, VAMP, Varubi (Rolapitant Hydrochloride), Vectibix (Panitumumab), VeIP, Velban (Vinblastine Sulfate), Velcade (Bortezomib), Velsar (Vinblastine Sulfate), Vemurafenib, Venclexta (Venetoclax), Venetoclax, Verzenio (Abemaciclib), Viadur (Leuprolide Acetate), Vidaza (Azacitidine), Vinblastine Sulfate, Vincasar PFS (Vincristine Sulfate), Vincristine Sulfate, Vincristine Sulfate Liposome, Vinorelbine Tartrate, VIP, Vismodegib, Vistogard (Uridine Triacetate), Voraxaze (Glucarpidase), Vorinostat, Votrient (Pazopanib Hydrochloride), Vyxeos (Daunorubicin Hydrochloride and Cytarabine Liposome), Wellcovorin (Leucovorin Calcium), Xalkori (Crizotinib), Xeloda (Capecitabine), XELIRI, XELOX, Xgeva (Denosumab), Xofigo (Radium 223 Dichloride), Xtandi (Enzalutamide), Yervoy (Ipilimumab), Yondelis (Trabectedin), Zaltrap (Ziv-Aflibercept), Zarxio (Filgrastim), Zejula (Niraparib Tosylate Monohydrate), Zelboraf (Vemurafenib), Zevalin (Ibritumomab Tiuxetan), Zinecard (Dexrazoxane Hydrochloride), Ziv-Aflibercept, Zofran (Ondansetron Hydrochloride), Zoladex (Goserelin Acetate), Zoledronic Acid, Zolinza (Vorinostat), Zometa (Zoledronic Acid), Zydelig (Idelalisib), Zykadia (Ceritinib), and/or Zytiga (Abiraterone Acetate). Also contemplated herein are chemotherapeutics that are PD1/PDL1 blockade inhibitors (such as, for example, lambrolizumab, nivolumab, pembrolizumab, pidilizumab, BMS-936559, Atezolizumab, Durvalumab, or Avelumab).

Alternatively, the additional therapeutic agent can be an antiviral agent selected from but not limited to a 5-substituted 2-deoxyuridine analog, a nucleoside analog, a (non-nucleoside) pyrophosphate analog, a nucleoside reverse transcriptase (RT) inhibitor (NRTI), a nonnucleoside reverse transcriptase (NNRTI), a protease inhibitor (PI), and integrase inhibitor, an entry inhibitor, and acyclic guanosine analog, an acyclic nucleoside phosphonate (ANP) analog, a hepatitis C virus (HCV) NSSA and NSSB inhibitor, and influenza virus inhibitor, an immunostimulator, an interferon, an oligonucleotide, and an antimitotic inhibitor. Non-limiting examples of antiviral agents are acyclovir, famciclovir, valacyclovir, penciclovir, ganciclovir, ritonavir, lopinavir, saquinavir, and the like; cimetidine; ranitidine; captopril; metform in; bupropion; fexofenadine; oxcarbazepine; leveteracetam; tramadol; or any of their isomers tautomers, analogs, polymorphs, solvates, derivatives, or pharmaceutically acceptable salts.

Alternatively, the additional therapeutic agent can be an antibiotic agent selected from but not limited to penicillin, tetracycline, cephalosporin, lincomycin, a macrolide, a sulfonamide, a glycopeptide, an aminoglycoside, and a carbapenem. Non-limiting examples of antiviral agents are amoxicillin, doxycycline, cephalexin, ciprofloxacin, clindamycin, metronidazole, azithromycin, sulfamethoxazole and trimethoprim, clavulanate, and levofloxacin.

(V) Kits

A further aspect of the present disclosure provides kits comprising the at least one of the fusion peptides as detailed above, and/or at least one of the Fc-bound feeder cells, and/or at least one Fc-bound engineered particle (PM particle and/or exosome) as detailed above. Fusion peptides can be provided in suitable containers along with other kit components such as cell reagents, cell growth media, selection media, protein purification reagents, buffers, and the like. The kits provided herein generally include instructions for carrying out the methods detailed below. Instructions included in the kits may be affixed to packaging material or may be included as a package insert. While the instructions are typically written or printed materials, they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" can include the address of an internet site that provides the instructions.

EXAMPLES

Example 1—Engagement of CD16 Via the Fc Region Enhances Proliferation Rate Past Day 14

The K562 cell line, i.e., a cell line expressing 41BBL and membrane bound IL-21 ("CSTX-002"), was obtained.

A separate sample of the K562 cells was transfected with NA-Fc to produce Fc-bound K562 cells ("CSTX002-Fc").

Peripheral blood mononuclear cells (PBMCs) were obtained from leukocyte sources from two different donors (L43 and L44) and were divided into multiple aliquots. A sample of PBMCs from each donor was tested for NK cell expansion in the presence of CSTX002, and another sample tested for NK cell expansion in the presence of CSTX002-Fc.

PBMCs isolated from buffy coat by Ficoll-Paque density gradient were grown in SCGM CellGro media supplemented with 10% FBS and 100 U/mL of IL-2 and Mitomycin C-treated or irradiated feeder cells, either CSTX002 cells or CSTX002-Fc cells, in co-culture at a ratio of 1 feeder cells per NK cell. Cells were maintained at 37° C. in a humidified atmosphere with 5% $CO_2$. Starting on day 5 of culture media were exchanged every other day by replacing half of the media with fresh media supplemented with 100 U of IL2. Cells were counted every other day and the culture content was checked regularly starting on day 7.

Figure 5:
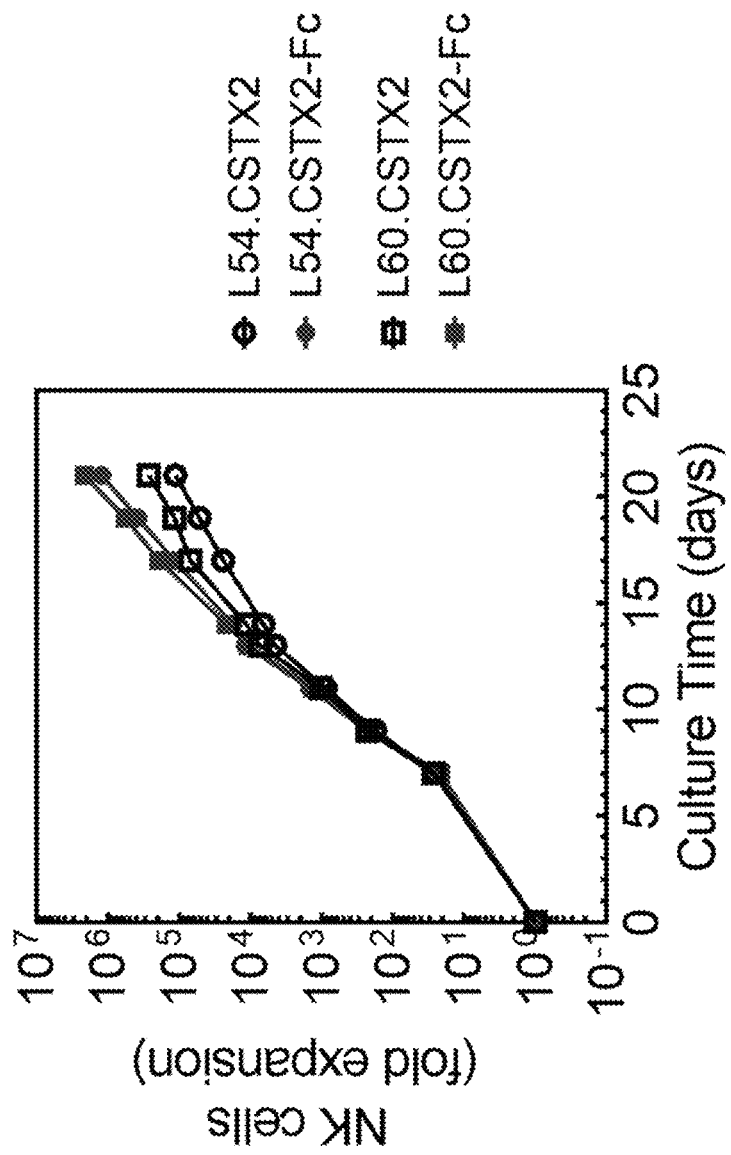
FIG. 5 shows engagement of CD16 via the Fc region enhances proliferation rate past day 14. NK cells were expanded from PBMCs sourced from two donors [L54 (circles) or L44 (squares) using either CSTX002 (open symbols) or CSTX002-Fc cell lines (closed symbols) as feeder cells. CD16 engagement allows for increased proliferation of NK cells. NK cells from both donors expanded at the same rate upon stimulation with IL21 alone (CSTX2) or IL21 and Fc (CSTX2-Fc) until day 14 at which, the Fc-stimulated cultures divided at an increased rate as compared to IL-21 only.

FIG. 5 presents a graph of expansion of NK cells versus days in culture, showing that engagement of CD16 via the Fc region enhances proliferation rate past day 14. NK cells were expanded from PBMCs sourced from two donors, L54 (circles) or L44 (squares), using either CSTX002 (open symbols) or CSTX002-Fc cell lines (closed symbols) as feeder cells. CD16 engagement allows for increased proliferation of NK cells. NK cells from both donors expanded at the same rate upon stimulation with IL21 alone, or IL21 and Fc, until day 14 at which, the Fc-stimulated cultures divided at an increased rate as compared to IL21 only.

Example 2—Cytotoxicity of Natural Killer Cells Expanded in Presence of Fc-bound Feeder Cells CSTX002 cells and CSTX002-Fc cells were prepared as described in Example 1. Cytotoxicity assays were performed as follows. Ovarian cancer derived target cell line SKOV3 transfected for green fluorescent protein (GFP) were used as targets to measure anti-tumor cytotoxicity of effector NK cells. Target cells were cultured alone (control wells) or co-cultured at $0.5 \times 10^6$ cells/mL with NK cells at indicated effector-to-target (E:T) ratios for 45 minutes in 37° C., 5% $CO_2$ atmosphere. The cells were then centrifuged and resuspended in Annexin V labelling buffer containing Annexin V-PacBlue antibody and incubated for 15 minutes at 4° C. prior to analysis by flow cytometry. The cytotoxicity was determined based on the absolute amount of Viable Target Cells (GFP+/Annexin V−) remaining in each well with effectors ($VTC^{E:T}$) and referenced to average VTC in "target alone" control wells ($VTC^{T\ ctrl}$).

Cytotoxicity$^{E:T}$(%)=($VTC^{E:T}$/Average $VTC^{T\ ctrl}$)*100

Figure 6:
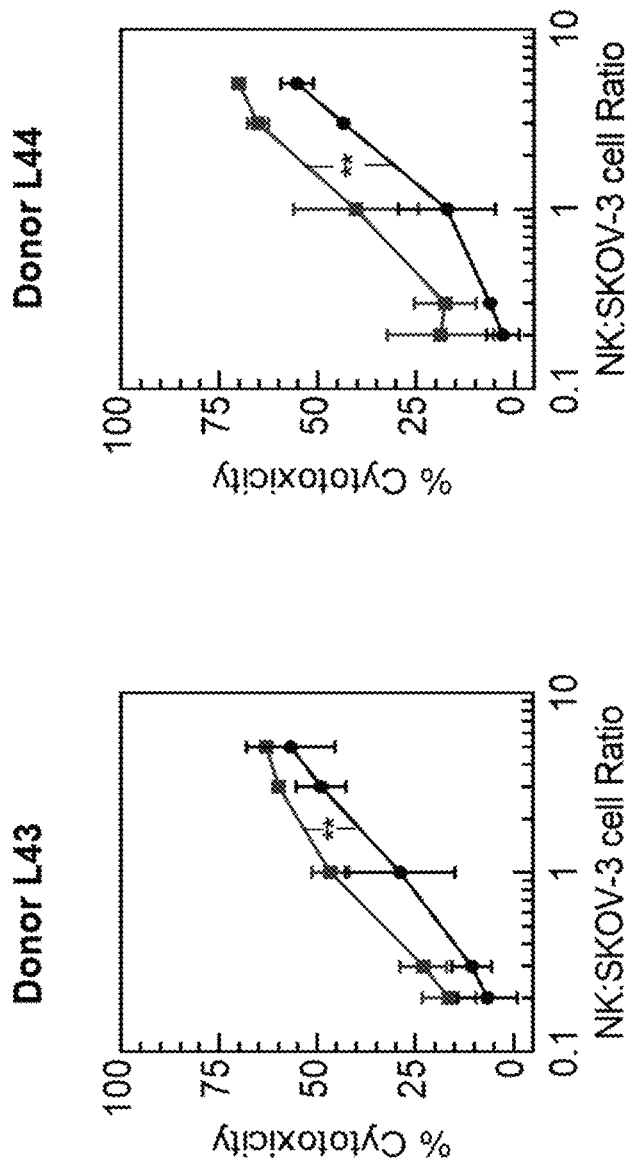
FIG. 6 presents two graphs, each showing the cytotoxicity of NK cells expanded from an initial population of PBMC's obtained from a different donor. NK cells were expanded from PBMCs using either CSTX002 (●) or CSTX002-Fc (■) cell lines as feeder cells. The NK cells expanded from two different donors with CSTX002-Fc were found to have increased cytotoxicity toward SKOV3 cells.

FIG. 6 presents two graphs, each showing the cytotoxicity of NK cells expanded from the PBMC's obtained from two different donors (L43 and L44). For each donor, NK cells were expanded from PBMCs using either CSTX002 (●) or CSTX002-Fc (■) cell lines as feeder cells. For each of the two different donors, NK cells expanded with CSTX002-Fc were found to have increased cytotoxicity toward SKOV3 cells.

Figure 7:
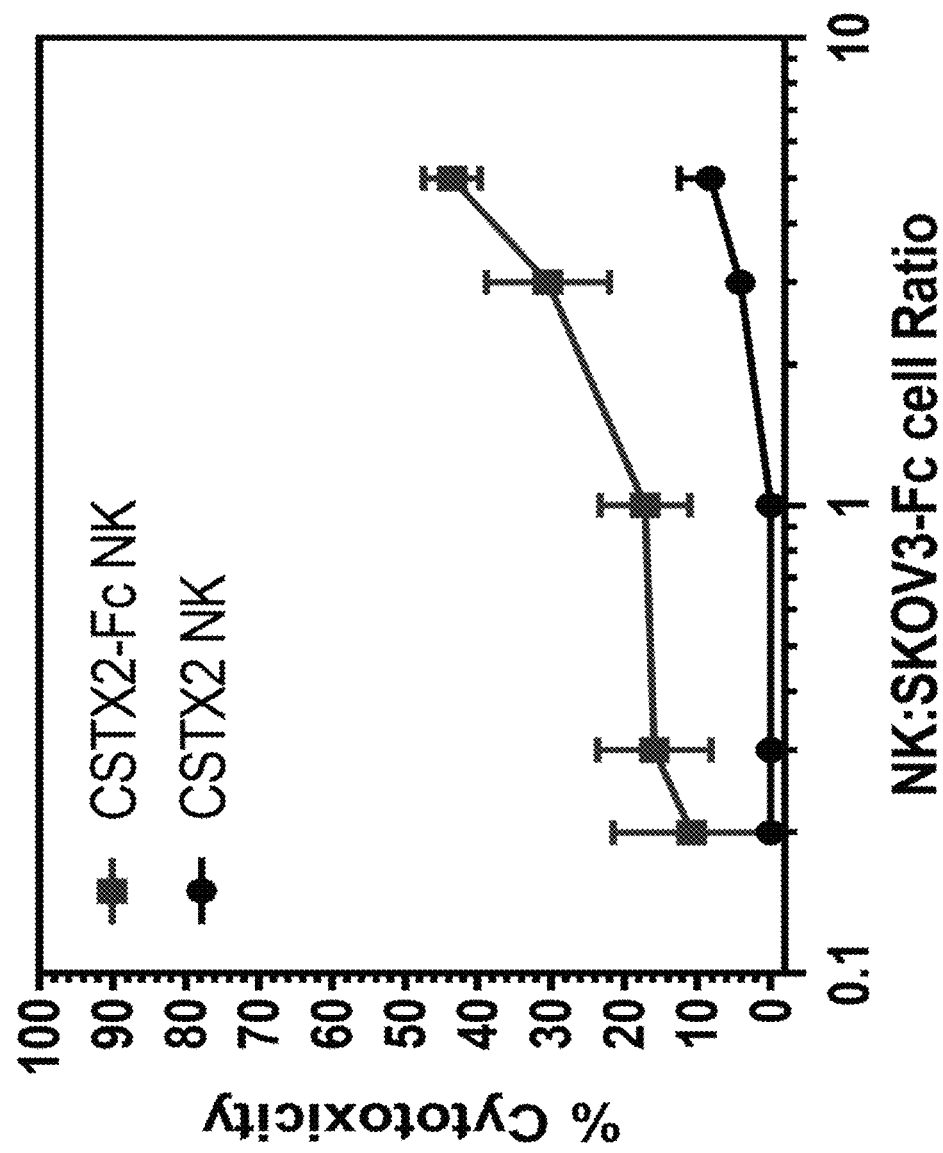
FIG. 7 shows that NK cells from a poorly responding donor expanded with Fc-bound feeder cells have increased cytotoxicity toward tumor targets expressing membrane-bound Fc to mimic antibody-coated tumor cells that would engage Antibody-Dependent Cell Cytotoxicity (ADCC). NK cells were expanded from PBMCs using either CSTX002 (●) or CSTX002-Fc (■) cell lines as feeder cells. The NK cells expanded with CSTX002-Fc were found to have increased cytotoxicity toward SKOV3-Fc cells.

Example 3—Increasing Cytotoxicity of Natural Killer Cells from a Poorly Responding Donor PBMCs PBMC's obtained from a donor that was previously observed to not have cytotoxicity against SKOV3 cells when expanded by stimulation with CSTX002 cells (no added Fc). NK cells were expanded from the PBMCs, previously observed to be poorly responsive, using either CSTX002 (●) or CSTX002-Fc (■) cell lines as feeder cells, as described in Example 1. The two different resulting NK cell populations were then each tested for cytotoxicity as also described in Example 1, but using SKOV3 transformed to express Fc. FIG. 7 is a graph of cytotoxicity of NK cells expanded from the PBMCs using either CSTX002 (●) or CSTX002-Fc (■). The results shown in FIG. 7 demonstrate that NK cells from the PBMC's obtained from the donor with poor cytotoxic response against SKOV3 cells responding well when expanded with Fc-bound feeder cells (CSTX002-Fc) showing cytotoxicity toward tumor targets, that have a bound Fc domain, relative to those NK cells from PBMC's obtained from the same poorly responding donor and expanded with feeder cells not bound to Fc (CSTX002). The NK cells expanded with CSTX002-Fc would better engage Antibody Dependent Cell Cytotoxicity and would enact higher killing activity against tumor targets bound with an antibody.

Example 4—Favorable Receptor Expression

Figure 8:
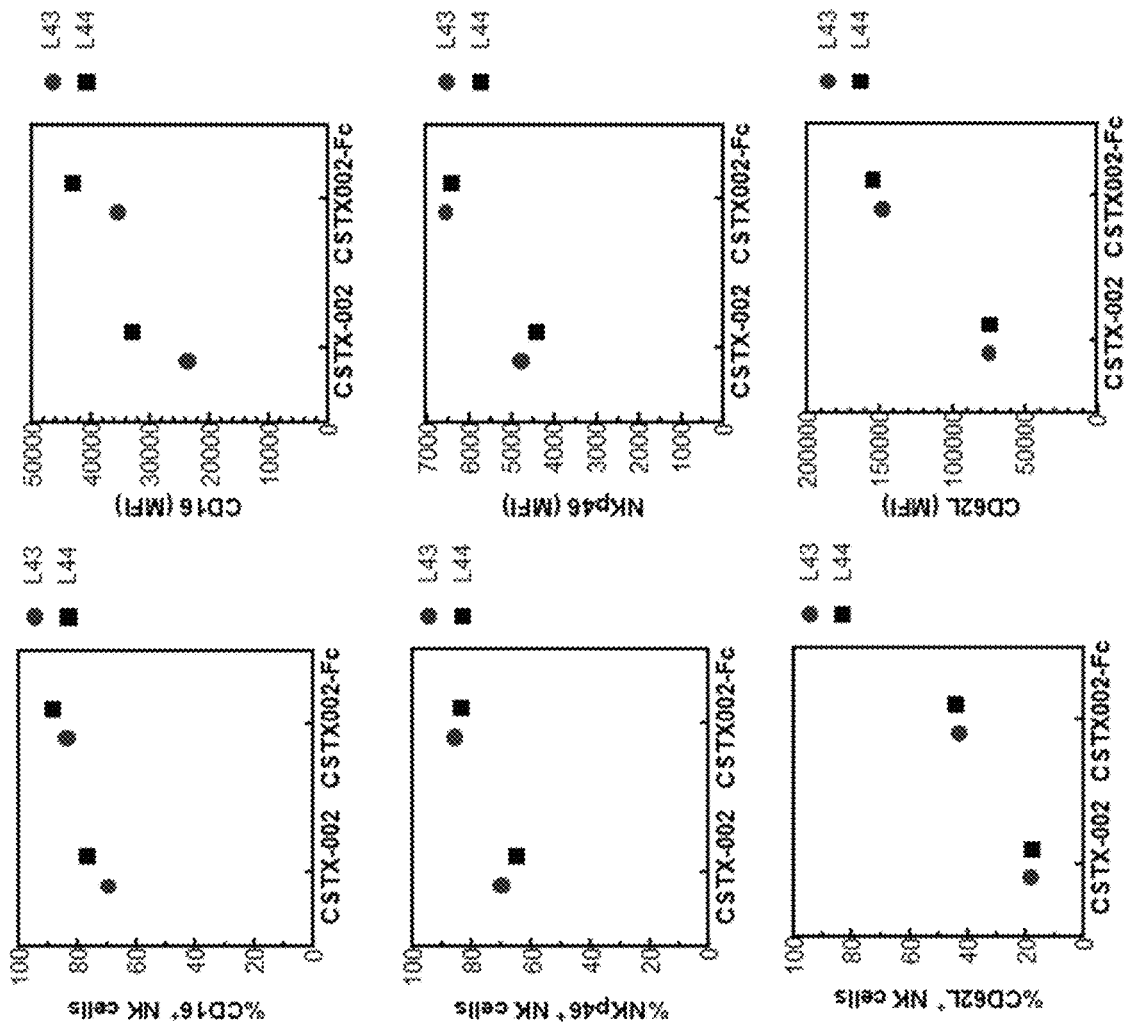
FIG. 8 is a series of six (6) graphs each showing comparative receptor expression by NK cells expanded with CSTX002 feeder cells with (CSTX002-Fc) and without (CSTX-002) membrane bound Fc. NK cells from PBMCs sourced from two donors L43 (●) or L44 (■) were expanded using either CSTX002 or CSTX002-Fc cell lines as feeder cells. The expanded NK cells were analyzed for their expression of receptors that are considered important for cytotoxic function and homing. The NK cells expanded with CSTX002-Fc have higher expression of CD16, NKp46 and CD62L.

NK cells were expanded from PBMCs sourced from two donors L43 (●) or L44 (■) using either CSTX002 or CSTX002-Fc cell lines as feeder cells, as described in Example 1. The resulting NK cells were then analyzed. FIG. 8 is a series of six (6) graphs each showing comparative receptor expression by NK cells expanded with CSTX002 feeder cells with or without membrane bound Fc. NK cells were expanded from PBMCs sourced from two donors L43 (●) or L44 (■) using either CSTX002 or CSTX002-Fc cell lines as feeder cells. The expanded NK cells were analyzed for their expression of receptors that are considered important for cytotoxic function or homing. The NK cells expanded with CSTX002-Fc have higher expression of CD16, NKp46 and CD62L, than NK cells expanded with CSTX002.

Example 5—Fc Bound Plasma Membrane Particles

Engineered K562 cells, i.e., a cell line expressing 41BBL and membrane bound IL-21, are treated as described in U.S. Pat. No. 9,623,082 to obtain PM-mb21-41BBL plasma membrane vesicles, or "CSTX002" particles or PM21 particles. Briefly, K562 are cultured in RPMI media supplemented with 10% FBS and the culture scaled up to 1 L. Cells are harvested by centrifugation at 1000×g, washed with cold PBS with 10 mM EDTA and resuspended in lysis buffer (50 mM HEPES, pH 7.4, protease inhibitor cocktail). Cells are disrupted and the lysate solution centrifuged at 300×g for 15 minutes to remove any remaining whole cells. The crude plasma membranes are separated from the cytosolic components by centrifugation for 30 min at 4° C. The crude membranes are resuspended and further purified using a sucrose density gradient to yield pure plasma membrane vesicles, referred to as PM-mb21-41BBL.

A separate sample of K562 cells is transfected to express Fc to produce Fc-bound K562, which are then treated as described above to obtain Fc-bound PM-mb21-41BBL plasma membrane vesicles, or "CSTX002-Fc" particles.

Peripheral blood mononuclear cells (PBMC's) are obtained from a single donor and divided into samples. NK cell expansion from the PBMC's is tested in the presence of CSTX002 membrane particles or CSTX002-Fc membrane particles. The amount used of each membrane particle is 200 µg of membrane protein per 1 mL of culture. PBMCs isolated from blood by Ficoll-Paque density gradient are grown in SCGM CellGro media supplemented with 10% FBS and 100 U/mL of IL-2. Cells are maintained at 37° C. in a humidified atmosphere with 5% $CO_2$. Starting on day 5 of culture media were exchanged every other day by replacing half of the media with fresh media as well as replacing the amount of membrane removed through media replacement. Cells are counted every other day and the culture content is checked on days 7, 10 and 14.

Cytotoxicity assays are performed as described in Example 1. NK cells expanded with CSTX002-Fc will show increased cytotoxicity toward SKOV3 cells.

| SEQUENCES |
|---|
| SEQ ID NO: 29 |
| ATGAATCCAAATCAGAAAATAACAACCATTGGATCAATCTGTCTGGTAGT |
| CGGACTAATTAGCCTAATATTGCAAATAGGGAATATAATCTCAATATGGA |

SEQUENCES

TTAGCCATTCAATTCAAACTGGAAGTCAAAACCATACTGGAATATGCAAC
CAAAACATCATTACCTATAAAAATAGCACCTGGGTAAAGGACACAACTTC
AGTGATATTAACCGGCAATTCATCTCTTTGTCCCATCCGTGGGTGGGCTA
TATACAGCAAAGACAATAGCATAAGAATTGGTTCCAAAGGAGACGTTTTT
GTCATAAGAGAGCCCTTTATTTCATGTTCTCACTTGGAATGCAGGACCTT
TTTTCTGACCGACAAAACTCACACATGCCCACCGTGCCCAGCACCTGAAC
TCCTGGGGGACCGTCAGTCTTCCTCCTGCCCCCAAAACCCAAGGACACC
CTCATGATCTCCCGGACCCCTGAGGTCACATGCGTGGTGGTGGACGTGAG
CCACGAAGACCCTGAGGTCAAGTTCAACTGGTACGTGGACGGCGTGGAGG
TGCATAATGCCAAGACAAAGCCGCGGGAGGAGCAGTACAACAGCACGCTG
CGTGTGGTCAGCATTCTCACCGTCCTGCACCAGGACTGGCTGAATGGCAA
GGAGTACAAGTGCAAGGTCTCCAACAAAGCCCTCCCAGCCCCCATCGAGA
AAACCATCTCCAAAGCCAAAGGGCAGCCCCGAGAACCACAGGTGTACACC
CTGCCCCCATCCCGGGAGGAGATGACCAAGAACCAGGTCAGCCTGACCTG
CCTGGTCAAAGGCTTCTATCCCAGCGACATCGCCGTGGAGTGGGAGAGCA
ATGGGCAGCCGGAGAACAACTACAAGACCACGCCTCCCGTGCTGGACTCC
GACGGCTCCTTCTTCCTCTACAGCAAGCTCACCGTGGACAAGAGCAGGTG
GCAGCAGGGGAACGTCTTCTCATGCTCCGTGATGCACGAGGCTCTGCACA
ACCACTACACGCAGAAGAGCCTCTCCCTGTCTCCGGGTAAA

SEQ ID NO: 30
ATGAATCCAAATCAGAAAATAACAACCATTGGATCAATCTGTCTGGTAGT
CGGACTAATTAGCCTAATATTGCAAATAGGGAATATAATCTCAATATGGA
TTAGCCATTCAATTCAAACTGGAAGTCAAAACCATACTGGAATATGCAAC
CAAAACATCATTACCTATAAAAATAGCACCTGGGTAAAGGACACAACTTC
AGTGATATTAACCGGCAATTCATCTCTTTGTCCCATCCGTGGGTGGGCTA
TATACAGCAAAGACAATAGCATAAGAATTGGTTCCAAAGGAGACGTTTTT
GTCATAAGAGAGCCCTTTATTTCATGTTCTCACTTGGAATGCAGGACCTT
TTTTCTGACCGACAAAACTCACACATGCCCACCGTGCCCAGCACCTGAAC
TCCTGGGGGACCGGATGTCTTCCTCTTCCCCCCAAAACCCAAGGACACC
CTCATGATCTCCCGGACCCCTGAGGTCACATGCGTGGTGGTGGACGTGAG
CCACGAAGACCCTGAGGTCAAGTTCAACTGGTACGTGGACGGCGTGGAGG
TGCATAATGCCAAGACAAAGCCGCGGGAGGAGCAGTACAACAGCACGTAC
CGTGTGGTCAGCGTCCTCACCGTCCTGCACCAGGACTGGCTGAATGGCAA
GGAGTACAAGTGCAAGGTCTCCAACAAAGCCCTCCCACTGCCCGAAGAGA
AAACCATCTCCAAAGCCAAAGGGCAGCCCCGAGAACCACAGGTGTACACC
CTGCCCCCATCCCGGGAGGAGATGACCAAGAACCAGGTCAGCCTGACCTG
CCTGGTCAAAGGCTTCTATCCCAGCGACATCGCCGTGGAGTGGGAGAGCA
ATGGGCAGCCGGAGAACAACTACAAGACCACGCCTCCCGTGCTGGACTCC
GACGGCTCCTTCTTCCTCTACAGCAAGCTCACCGTGGACAAGAGCAGGTG

GCAGCAGGGGAACGTCTTCTCATGCTCCGTGATGCACGAGGCTCTGCACA
ACCACTACACGCAGAAGAGCCTCTCCCTGTCTCCGGGTAAATAATAA

SEQ ID NO: 31
ATGAATCCAAATCAGAAAATAACAACCATTGGATCAATCTGTCTGGTAGT
CGGACTAATTAGCCTAATATTGCAAATAGGGAATATAATCTCAATATGGA
TTAGCCATTCAATTCAAACTGGAAGTCAAAACCATACTGGAATATGCAAC
CAAAACATCATTACCTATAAAAATAGCACCTGGGTAAAGGACACAACTTC
AGTGATATTAACCGGCAATTCATCTCTTTGTCCCATCCGTGGGTGGGCTA
TATACAGCAAAGACAATAGCATAAGAATTGGTTCCAAAGGAGACGTTTTT
GTCATAAGAGAGCCCTTTATTTCATGTTCTCACTTGGAATGCAGGACCTT
TTTTCTGACCGACAAAACTCACACATGCCCACCGTGCCCAGCACCTGAAC
TCCTGGGGGACCGTCAGTCTTCCTCTTCCCCCCAAAACCCAAGGACACC
CTCATGATCTCCCGGACCCCTGAGGTCACATGCGTGGTGGTGGACGTGAG
CCACGAAGACCCTGAGGTCAAGTTCAACTGGTACGTGGACGGCGTGGAGG
TGCATAATGCCAAGACAAAGCCGCGGGAGGAGCAGTACAACAGCACGCTG
CGTGTGGTCAGCGTCCTCACCGTCCTGCACCAGGACTGGCTGAATGGCAA
GGAGTACAAGTGCAAGGTCTCCAACAAAGCCCTCCCAGCCCCCATCGAGA
AAACCATCTCCAAAGCCAAAGGGCAGCCCCGAGAACCACAGGTGTACACC
CTGCCCCCATCCCGGGAGGAGATGACCAAGAACCAGGTCAGCCTGACCTG
CCTGGTCAAAGGCTTCTATCCCAGCGACATCGCCGTGGAGTGGGAGAGCA
ATGGGCAGCCGGAGAACAACTACAAGACCACGCCTCCCGTGCTGGACTCC
GACGGCTCCTTCTTCCTCTACAGCAAGCTCACCGTGGACAAGAGCAGGTG
GCAGCAGGGGAACGTCTTCTCATGCTCCGTGATGCACGAGGCTCTGCACAACCACTACACGCAGAAGAG
CCTCTCCCTGTCTCCGGGTAAA

---

What is claimed is:

1. An NK cell expanding composition comprising a membrane-bound inverted Fc domain bound to an external surface of a feeder cell, an engineered PM particle, or an engineered exosome, wherein the inverted Fc domain is part of a fusion protein comprising a transmembrane domain linked to the amino terminus of the inverted Fc domain, wherein the amino terminus of the inverted Fc domain is oriented towards the feeder cell, engineered PM particle, or engineered exosome, and wherein the transmembrane domain comprises a signal anchor sequence selected from the transmembrane domain of neuraminidase, the signal-anchor from parainfluenza virus hemagglutinin-neuraminidase, the signal-anchor from the transferrin receptor, the signal-anchor from the MHC class II invariant chain, the signal-anchor from P glycoprotein, the signal-anchor from asialoglycoprotein receptor, and the signal-anchor from a neutral endopeptidase.

2. The NK cell expanding composition of claim 1, wherein the transmembrane domain comprises the signal-anchor from parainfluenza virus hemagglutinin-neuraminidase.

3. The NK cell expanding composition of claim 1, wherein the fusion protein further comprises a peptide linker between the transmembrane domain and the inverted Fc domain.

4. The NK cell expanding composition of claim 1, wherein the engineered PM particle or the engineered exosome is purified or derived from NK cell feeder cells transfected or transduced with a nucleic acid encoding the fusion protein.

5. The NK cell expanding composition of claim 1, wherein the NK cell expanding composition is attached to a solid surface.

6. The NK cell expanding composition of claim 1, wherein the engineered PM particle or engineered exosome further comprises at least one NK cell effector agent.

7. The NK cell expanding composition of claim 6, wherein the at least one NK cell effector agent is IL-15, IL-21, IL-2, IL-12, IL-18, MICA, UBLP, 2sB4, LFA-1, a Notch ligand, a ligand for NKp46, BCM1/SLAMF2, a TLR ligand, 41BBL, or a NKG2D ligand.

8. The NK cell expanding composition of claim 7, wherein the at least one NK cell effector agent is IL-21.

9. The NK cell expanding composition of claim 7, wherein the at least one NK cell effector agent is IL-21 and 41BBL.

10. The NK cell expanding composition of claim 1, wherein the NK cell expanding composition increases NK cell cytotoxicity.

11. An NK cell expanding infusion formulation comprising the NK cell expanding composition of claim 1 and a pharmaceutically acceptable carrier.

12. An NK cell expanding media formulation comprising the NK cell expanding composition of claim 1 and at least one media component.

13. The NK cell expanding media formulation of claim 12, further comprising at least one additional component selected from the group consisting of IL-2, IL-12, IL-18, NAM, a reductant, human platelets, a human platelet lysate, insulin, and an ascorbate.

14. A method of increasing NK cell cytotoxicity, comprising exposing an initial population of NK cells in vitro to the NK cell expanding composition of claim 1.

15. The method of claim 14, wherein the NK cell expanding composition comprises the feeder cell.

16. The method of claim 14, wherein the NK cell expanding composition comprises the engineered PM particle or the engineered exosome.

* * * * *